US010910833B2

(12) United States Patent
Ellenberger

(10) Patent No.: US 10,910,833 B2
(45) Date of Patent: Feb. 2, 2021

(54) ADAPTABLE RECHARGING AND LIGHTING STATION AND METHODS OF USING THE SAME

(71) Applicant: Elevate Technologies Corporation, Fresno, CA (US)

(72) Inventor: John C. Ellenberger, Fresno, CA (US)

(*) Notice: Subject to any disclaimer, the term of this patent is extended or adjusted under 35 U.S.C. 154(b) by 0 days.

(21) Appl. No.: 15/019,910

(22) Filed: Feb. 9, 2016

(65) Prior Publication Data

US 2016/0219664 A1 Jul. 28, 2016

Related U.S. Application Data

(63) Continuation of application No. 15/006,097, filed on Jan. 25, 2016, now Pat. No. 10,784,680.
(Continued)

(51) Int. Cl.
*H02J 1/00* (2006.01)
*H02J 7/00* (2006.01)
(Continued)

(52) U.S. Cl.
CPC .............. *H02J 1/00* (2013.01); *H02J 7/0003* (2013.01); *H02J 7/0021* (2013.01);
(Continued)

(58) Field of Classification Search
CPC ...... H02J 1/00; H02J 7/35; H02J 7/355; H02J 7/0021; H02J 7/0003; H02J 7/0024;
(Continued)

(56) References Cited

U.S. PATENT DOCUMENTS 4,114,082 A 9/1978 Scheidler
4,297,629 A 10/1981 Godard et al.
(Continued)

FOREIGN PATENT DOCUMENTS

CA 2854784 5/2013
CN 102325414 5/2014
(Continued)

OTHER PUBLICATIONS

Merriam-Webster Dictionary, Oct. 1, 2020, https://www.merriam-wester.com/dictionary/battery, the word "Battery" (Year: 2020).*
(Continued)

*Primary Examiner* — Jung Kim
(74) *Attorney, Agent, or Firm* — William K. Nelson; Mark D. Miller; Sierra IP Law, PC

(57) ABSTRACT

The present invention includes self-contained, rechargeable power systems for areas having unreliable electrical grids or no electrical grid at all, and methods related thereto. The system may include one or more solar panels of various sizes to provide an off-grid power generation source, battery receivers for receiving batteries of various chemistries, and a control circuitry that is operable to detect the voltage and/or current output of the batteries that are installed in the system to determine their specific battery chemistry and then adjust the charge algorithm of the batteries to optimize both the charge capacity and the cycle life of the batteries. The control circuitry may also be operable to switch configurations of the solar panels and/or the batteries to optimize performance of the system. The system may be operable to power one or more light emitters and/or external electronic devices connected through the system by a charge port.

10 Claims, 15 Drawing Sheets

Related U.S. Application Data

(60) Provisional application No. 62/106,857, filed on Jan. 23, 2015.

(51) Int. Cl.

| | | |
|---|---|---|
| *H02J 7/35* | (2006.01) | |
| *H05B 45/00* | (2020.01) | |
| *H05B 45/10* | (2020.01) | |
| *H05B 45/37* | (2020.01) | |
| *H05B 45/50* | (2020.01) | |
| *F21S 6/00* | (2006.01) | |
| *F21S 9/02* | (2006.01) | |
| *F21Y 115/10* | (2016.01) | |

(52) U.S. Cl.
CPC ........ *H02J 7/0024* (2013.01); *H02J 7/00032* (2020.01); *H02J 7/0047* (2013.01); *H02J 7/35* (2013.01); *H05B 45/00* (2020.01); *H05B 45/10* (2020.01); *H05B 45/37* (2020.01); *H05B 45/50* (2020.01); *F21S 6/003* (2013.01); *F21S 9/02* (2013.01); *F21Y 2115/10* (2016.08)

(58) Field of Classification Search
CPC ............ H05B 33/0815; H05B 33/0884; H05B 33/0845; H05B 33/0842
See application file for complete search history.

(56) References Cited

U.S. PATENT DOCUMENTS

| | | | |
|---|---|---|---|
| 5,121,046 A | | 6/1992 | McCullough |
| 5,568,037 A | | 10/1996 | Massaroni et al. |
| 5,729,117 A | | 3/1998 | Fukuda |
| 6,057,670 A | | 5/2000 | Sink et al. |
| 6,160,377 A | | 12/2000 | Fujii |
| 6,268,711 B1* | | 7/2001 | Bearfield .............. H02J 7/0024 320/116 |
| 6,430,692 B1 | | 8/2002 | Kimble et al. |
| 6,784,638 B2 | | 8/2004 | Yang |
| 6,933,627 B2 | | 8/2005 | Wilhelm |
| 6,977,479 B2 | | 12/2005 | Hsu |
| 7,898,223 B2* | | 3/2011 | Takeda .................... H02M 3/07 320/117 |
| 8,022,571 B2* | | 9/2011 | Warren ..................... H02J 7/35 307/64 |
| 8,084,963 B2 | | 12/2011 | Chandler et al. |
| 8,299,712 B2 | | 10/2012 | Smith, III et al. |
| 8,358,099 B2 | | 1/2013 | Yamaguchi |
| 8,829,799 B2 | | 9/2014 | Recker et al. |
| 8,970,161 B1 | | 3/2015 | Cuadros |
| 9,089,016 B2 | | 7/2015 | Recker et al. |
| 9,338,839 B2 | | 5/2016 | Recker et al. |
| 2003/0069704 A1 | | 4/2003 | Bean |
| 2004/0204179 A1 | | 10/2004 | Hsu |
| 2006/0132099 A1 | | 6/2006 | Aradachi et al. |
| 2008/0180061 A1* | | 7/2008 | Koski ................. H01M 10/441 320/117 |
| 2009/0079412 A1 | | 3/2009 | Kuo |
| 2009/0146573 A1 | | 6/2009 | Deng |
| 2009/0224681 A1 | | 9/2009 | Bassford et al. |
| 2010/0289447 A1 | | 11/2010 | Dobson et al. |
| 2010/0303654 A1 | | 12/2010 | Petersen et al. |
| 2011/0118916 A1 | | 5/2011 | Gullichsen |
| 2011/0181244 A1 | | 7/2011 | Badger |
| 2011/0187327 A1 | | 8/2011 | Oh et al. |
| 2011/0221383 A1 | | 9/2011 | Uehashi et al. |
| 2012/0025750 A1 | | 2/2012 | Margo |
| 2012/0035871 A1 | | 2/2012 | Cofta et al. |
| 2012/0112548 A1 | | 5/2012 | Tai |
| 2012/0024907 A1 | | 10/2012 | Yang |
| 2012/0326512 A1 | | 12/2012 | Yokoyama |
| 2013/0043826 A1 | | 2/2013 | Workman et al. |
| 2013/0141046 A1* | | 6/2013 | Law ..................... H02J 7/0027 320/111 |
| 2013/0169214 A1 | | 7/2013 | Tseng |
| 2013/0200811 A1 | | 8/2013 | Steininger et al. |
| 2013/0200841 A1 | | 8/2013 | Farkas et al. |
| 2013/0320926 A1 | | 12/2013 | Kerfoot, Jr. et al. |
| 2013/0328529 A1* | | 12/2013 | Zbrozek ................ H02J 7/0016 320/118 |
| 2014/0268697 A1 | | 9/2014 | Smith et al. |
| 2014/0285133 A1 | | 9/2014 | Toledo et al. |
| 2015/0048778 A1* | | 2/2015 | Davidson ................ H02J 7/355 320/101 |
| 2016/0356469 A1 | | 12/2016 | Garcia et al. |
| 2017/0051886 A1 | | 2/2017 | Liu et al. |

FOREIGN PATENT DOCUMENTS

| | | |
|---|---|---|
| CN | 104782022 | 7/2015 |
| CN | 205847689 | 12/2016 |
| CN | 207184858 | 4/2018 |
| CN | 207893446 | 9/2018 |
| CZ | 305793 | 3/2016 |
| DE | 102012208415 | 11/2013 |
| EP | 2544511 | 1/2013 |
| EP | 2524572 | 10/2013 |
| WO | 2011024062 | 3/2011 |
| WO | 2012015834 | 2/2012 |
| WO | 2014192986 | 12/2014 |

OTHER PUBLICATIONS

Srinivasan et al., Solar Home Lighting System, English translation of Indian Patent Publication 1987/CHE/2008 Feb. 26, 2010.

Schneider Electric Corporate, Battery Charging Station Solar and Grid powered Battery Charging Station for lighting and mobile charging, viewed Dec. 19, 2014 at the following web address: http://www.schneiderelectric.com/products/ww/en/8600accesstoenergycollectivesolutions/ 8610villayacollectivesolutions/62206batterychargingstation/.

Pratima Bisen Kanudia, Off-Grid Solar Power in Rural India, Presentation at ETSAP meeting, Lisbon, Dec. 10, 2012.

Schneider Electric Corporate, Portable OffGrid Lighting Solar powered portable LED Lamps with mobile charger, viewed Dec. 19, 2014 at the following web address: http://www.schneiderelectric.com/products/ww/en/8500accesstoenergyhomesystems/8520mobiyaportableproducts/62203portableoffgridlighting/.

Nokero Solar, C223 Solar Light with Phone Charger, viewed at least as early Jan. 6, 2015, viewable at the following web address: http://www.nokero.com/C223-Solar-Light-Bulb-and-Charger-p/c223.htm.

Barefoot Power, Firefly Solar Lamp and Panel, viewed at least as early Jan. 6, 2015, viewable at the following web address: http://www.barefootpower.com/index.php/products/item/141-firefly-solar-lamp-and-panel.

Green Light Planet, Solar Lighting + USB Charging, viewed at least as early Jan. 6, 2015, viewable at the following web address: https://www.greenlightplanet.com/en/shop/pro-all-night/.

D.light design, d.light S300: Mobile Charging + Light, viewed at least as early Jan. 6, 2015, viewable at the following web address: http://www.dlight.com/solar-lighting-products/multifunction/dlight-s300/.

Goal Zero Inc., Goal Zero Products, http://www.goalzero.com/solar-kits.

Hong Hyo Jin et al., Apparatus for Preventing Overcharging of Secondary Battery Cell, English Abstract of WIPO Patent Publication WO2014192986, Dec. 4, 2014, European Patent Organization, http://www.epo.org/searching/free/espacenet.html.

Invitation to Pay Additional Fees dated Apr. 22, 2016 and issued by International Search Authority/US in International Patent Application No. PCT/US 16/14789—PCT equivalent of U.S. Appl. No. 15/019,910.

Patent Cooperation Treaty Application No. PCT/US16/14789—Preliminary Report on Patentability, dated Aug. 14, 2017.

International Search Authority, WIPO, Patent Cooperation Treaty International Search Report, dated Jul. 15, 2016, Int'l Application No. PCT/US 16/14789.

(56) References Cited

OTHER PUBLICATIONS

PHOCOS Solar Charge Controller—User Manual, published at least as early as Jan. 22, 2015.
Solarland Solar Charge Controller GP Series—Technical Data, published at least as early as Jan. 22, 2015.
Solarland Solar Charge Controller NR Series—Technical Data, published at least as early as Jan. 22, 2015.
Morningstar SHS Solar Controller—User's Manual, published at least as early as Jan. 22, 2015.
Morningstar SHS Solar Controller—Technical Information, published at least as early as Jan. 22, 2015.
Texas Instruments—Energy Harvesting: Solar-TI's Broad Portfolio Provides the Total Solution for Solar Energy Harvesting, published at least as early as Jan. 22, 2015.
Morningstar—Morningstar's TrakStar MPPT Technology & Maximum Input Power, published at least as early as Jan. 22, 2015.
Morningstar—Traditional PWM vs Morningstar's TrakStar MPPT Technology, published at least as early as Jan. 22, 2015.
Morningstar—Why PWM whitepaper, published at least as early as Jan. 22, 2015.
Morningstar—Diagram: Paralleling—Parallel Charging with 2 or more Controllers, published at least as early as Jan. 22, 2015.
Morningstar—Sunsaver MPPT With Trakstar MPPT Technology, Installation and Operation Manual, published at least as early as Jan. 22, 2015.
Morningstar—SunSaver MPPT, Solar Controller with Maximum Power Point Tracking—Technical Specifications, published at least as early as Jan. 22, 2015.
Morningstar—ProStar Solar Controller—Technical Specifications, published at least as early as Jan. 22, 2015.
Morningstar—ProStar Solar Controller—Operator's Manual, published at least as early as Jan. 22, 2015.
PHOCOS—Pico, The multifunctional high power LED light, accessed by Applicant Aug. 24, 2015—Publication date unknown.
PHOCOS—Pico Solar System—System Pamphlet, accessed by Applicant Aug. 24, 2015—Publication date unknown.
PHOCOS—Sistema Pico Light—Diagram, accessed by Applicant Aug. 24, 2015—Publication date unknown.

* cited by examiner

FIG. 14

ADAPTABLE RECHARGING AND LIGHTING STATION AND METHODS OF USING THE SAME

This application is a continuation application of U.S. application Ser. No. 15/006,097, filed Jan. 25, 2016, which claims the benefit of U.S. Provisional Application No. 62/106,857 filed on Jan. 23, 2015. Both preceding applications are incorporated herein by this reference in their entireties.

FIELD OF THE INVENTION

The present invention relates to a charging and lighting station, and more particularly to a solar power/recharging station for powering lights and external electronic devices, and recharging batteries and rechargeable devices, and methods of using and operating the same.

BACKGROUND OF THE INVENTION

Devices that utilize rechargeable batteries and solar panels for charging the batteries are useful in underdeveloped and developing countries and in remote areas where there is no reliable electric power grid system available. Alternative power sources for lighting, powering, and recharging devices are needed more than ever because of the modern proliferation and reliance upon electronic devices for communication.

Such systems typically have set, inflexible designs that include only a specific solar panel or set of solar panels and a specifically designed battery or a specific type of battery. The designers of such systems often constrain the design, making it easier to implement. Thus, the purchaser or user of such systems typically has no options for expanding, changing, or adjusting such systems. Such systems typically have a specific, custom solar panel. This allows the designer to dictate the exact voltage and current input to the circuit. However, this eliminates choice and upgradeability for the consumer. For instance, to control the cost of the product a designer may choose to provide a low power solar panel with the product, which works well in regions of the world with high incidence of solar radiation. If that product is sold where cloud cover is common or there are other causes of low solar radiation, the custom solar panel will not produce enough energy to properly power the unit. And because the solar panel is custom to that specific product, adding another solar panel to the product or changing the panel to a higher power solar panel to increase the power input to the circuit is often not an option for the consumer.

Such systems or products are also often designed around one battery type, requiring the purchaser to replace the batteries with the same type of batteries as needed. Some products will accept third party primary (non-rechargeable) or secondary (rechargeable) batteries of standard sizes that can be purchased from various sources. However, the user of the system or product may be confused because of there may be several different battery chemistries available within the same battery package size (e.g., AA, AAA, D, etc.). Consequently, systems limited to a single battery chemistry create a risk that the user will install batteries having chemistries that are incompatible with the system, which may result in system malfunction. Malfunctions can occur by installing batteries having a voltage that is too high or too low for the design of the system. Malfunctions can also occur if the product is designed to recharge secondary batteries, but primary batteries are improperly installed. In addition, the wrong type of secondary batteries (with the wrong chemistry) can damage the unit when they are installed because the system will apply its standard charging algorithm, which may be incompatible with the battery chemistry. A purchaser may even install several different types of batteries within the same unit, compounding these same issues. Thus, when the designer constrains the design to one specific battery type, the risk of product failure due to installation of the wrong battery type is then transferred to the purchaser, who is likely unaware of the risk.

Other manufacturers may eliminate the risk that the user will install the wrong batteries by designing a custom battery pack that is unique to the product. The custom battery pack may or may not be replaceable. If the battery pack is not replaceable, the product is unfortunately discarded when the batteries no longer function, which results in waste of materials and costs. In other cases, the product may be designed to allow for the replacement of the custom battery pack when the battery pack no longer functions. Because custom battery packs are arranged and installed in the product in specific configurations and the product is not designed to charge one battery at a time, but rather the entire custom battery pack, the batteries are charged in an unbalanced and inefficient manner that results in a relatively short battery life for the custom battery packs and forces the consumer to purchase a new custom battery pack after relatively few charge-discharge cycles (referred to as "cycle life"). Typically, the custom battery packs are only available through the manufacturer who sells the custom replacement batteries to the consumer, or through $3^{rd}$ party vendors selling knock-offs that are often inferior and/or unreliable.

Consumers may not understand that all batteries (primary and secondary, and custom battery packs) fail over time. Because it is often not obvious to the consumer how to replace the batteries, the product is just set aside or thrown away, which may result in the consumer faulting the designer with creating a "cheap" product. For the consumer that understands that all batteries will eventually fail, there are other disadvantages to this design method. The need for a manufacturer or authorized agent to replace the batteries can put an undue hardship on the consumer, especially those in remote areas which have the greatest need for battery-powered products. Also, "custom" battery packs eliminate or reduce the likelihood of competition for the supply of replacement batteries for the manufacturer's product, likely resulting in higher costs for the replacement battery and the product.

The battery design choices made by the product manufacturers are driven by the power requirements of the device, the battery chemistries that are currently available, the risk of damage to the particular product that would result from installation of the wrong battery type, and other factors. Once the manufacturer determines the appropriate battery type, required current, and required voltage, the designer then devises a way for the batteries to be installed in the product. The batteries will be configured in series, or parallel, or perhaps a combination of both. Due to the constrained design, the batteries will always be installed in the same arrangement so that the proper voltage and current are achieved for the product. As already noted, the designer will often choose to provide a custom battery pack with the configuration determined at the factory, and so that they cannot be changed by the consumer.

The battery configuration chosen by the manufacturer may be optimized based on its discharge and charging characteristics. Since the battery's longevity depends on the output current, one battery configuration may be best for charging life of the battery pack. But based on the input power being used to charge the batteries, a different configuration may be best for charging. Since the user cannot be relied upon to change the physical configuration of the batteries based on the batteries being used to supply power versus when the batteries are being charged, the designer is forced to compromise one for the other when setting a single battery configuration.

There are many different battery chemistries available to device manufacturers, For example, the AA and the size-compatible 14500 battery packages may be made to utilize primary, such as zinc-carbon (dry cell), zinc-chloride, alkaline, or lithium chemistry; or a secondary chemistry, such as NiCd, nickel-metal hydride (NiMH), NiZn, $LiFePo_4$, or lithium ion chemistry. The different chemistries all have different strengths and weaknesses, and all have different monetary prices to the purchaser. Of the secondary type, different chemistries yield different amounts of recharge cycles (the literature reports anywhere from 200 recharge cycles to 2000 recharge cycles, depending on the chemistry). Also, different chemistries yield different output voltages, ranging from 1.2V nom to 3.7V nom. Different chemistries may also be best used with different discharge rates (the literature reports recommended discharge rates anywhere from 80 mA to 500 mA). In addition, as a battery is used to provide current, its voltage drops overtime in a way that is uniquely characteristic to its chemistry. Because of the variations in the characteristics of the different chemistries, it is standard practice for designers to first choose a specific battery chemistry in order to simplify the product design. Once the designer has determined the battery chemistry, the number of battery cells and their configuration (series, which adds voltage, or parallel, which adds current) must be selected, taking into account the overall range of voltage through the entire discharge curve of the particular battery type. These factors must be balanced with expected life of the battery and cost of the battery. These design choices result in a specific and constrained design. Often, the chosen design does not satisfy the preferences of all consumers, and thus may alienate a certain portion of the market.

There are particular markets in which the availability of power sources, including batteries, is limited and presents a significant economic burden to the local population. Solar power has been promoted as a potential power source for these underserved regions, but power storage for use in dark and night conditions is necessary to provide a consistent power source for such regions. Systems that are limited to specific battery chemistries can present a problem for the populations in these remote areas because batteries may be relatively scarce and the specific battery type required by the system may not be available. Thus, there is a need for systems that are able to accommodate multiple power and battery options.

SUMMARY OF THE INVENTION

The present invention includes devices that provide power for lighting and charging batteries and/or other electronic devices that can accommodate and utilize multiple power sources. More specifically, the present invention relates to a customizable system that may include one or more lamps and one or more charging ports for external electronic devices that utilize solar and/or battery power, where the system includes control circuitry that is operable to do one or more of the following: (1) identify the type of battery installed in the system, (2) switch between parallel and series configurations of batteries during charging based on the power available from a power source (e.g., solar panels), (3) switch between parallel and series configurations of batteries during discharging based on the chemistry of the batteries and the load on the system, (4) switch between power sources (e.g., from batteries to solar panels) for powering lights and/or charging an external electronic device, (5) switch between charging and discharging of one or more batteries installed therein based on the output of solar panels in the system and a load connected to the system, and (6) switch between series and parallel configurations of the solar panels to optimize voltage and current outputs for particular use (e.g., charging batteries and/or powering a load, such as a mobile phone), and methods of using the same. The invention is particularly suitable for use in remote locations and underdeveloped locations where there is no power grid system or the existing power grid system is unreliable.

Embodiments of the present invention may combine solar power, lights, batteries, one or more electronic control circuitries, and microprocessor firmware in a novel lighting system that gives the consumer considerable choice and customizability in the use of the product while maximizing the life to the system and minimizing the overall cost of ownership of the system. The elements of the system can be mixed and matched depending on the user's preferences. For example, the system may include multiple lamps, one or more solar panels of various sizes (3 W, 5 W, 10 W, etc.), and rechargeable batteries of a particular size (e.g., AA/14500), but of variable chemistry (e.g., the system is designed such that it can accommodate multiple battery chemistries, such as NiCd, nickel-metal hydride [NiMH], NiZn, $LiFePo_4$, or lithium ion chemistry). The system is operable to accommodate multiple battery chemistries because the firmware of the system is operable to (1) test and identify the type of batteries installed in the system based on the voltage output of the batteries, (2) adjust the configuration of the batteries between series and parallel based on the output voltage of the batteries or the voltage and current available to charge the batteries, and (3) apply a charging algorithm to the batteries that is adapted and optimized to the particular chemistry of the installed batteries. The system may be particularly useful in third world or lesser developed markets where power grids are absent or unreliable. The system provides a relatively inexpensive and self-charging light source and charging station.

The present invention avoids design constraints that manufacturers have accepted in the past, particularly with respect to battery requirements and solar panel requirements. The charging and power system of the present invention may accept both primary (non-rechargeable) and secondary (rechargeable) batteries of the correct size (14500 package). The chemical class (e.g., NiCd, nickel-metal hydride [NiMH], NiZn, $LiFePo_4$, lithium ion chemistry, etc.) of the installed batteries are identified by the microprocessor using a series of tests of electrical characteristics (e.g., voltage) of the batteries. The microprocessor may have firmware logic enabling it to analyze voltage readings from one or more configurations (e.g., series, parallel, and other specialized configurations) and other sensor readings (e.g., temperature sensor readings) sensors that are conductively connected to the batteries at one or more positions and/or are in proximity to the batteries. The battery class detection methods may allow the microprocessor to automatically adjust the configuration of multiple batteries installed in the system between series and parallel arrangements to optimize the battery discharge for powering the lighting elements connected to the system and, in some cases, powering one or more charging ports for external electronic devices. Embodiments of the present invention may also optimize the recharging of the installed batteries, in some cases while powering a USB charge port, based on power output from one or more solar panel(s). This invention also allows the user to power the system by installing primary batteries (which the system will recognize and not charge) or a mixed group of batteries of different chemistries (e.g., a alkaline battery in combination with NiMH batteries). This capability allows the user to power the system regardless of what kind of batteries are available to the purchaser. However, in such situations the batteries may only be used for lighting and charging electronics, and cannot be recharged.

To prevent damage to the system, the embodiments of the present invention may include safeguards to protect the device from the installation of various battery types (e.g., from a voltage surge from the installation of relatively high voltage batteries, such as Li ion batteries) or mixed battery types, while still allowing operation of the lamp and charging of external electronic devices that may be electronically connected to a charge port in the system. The electronics and firmware are designed in a manner that allows the system to analyze the voltage and current characteristics of the batteries in order to determine the type of batteries (the battery chemistry) of the installed batteries. Thus, the system may automatically discern the type of chemistry of the batteries that are installed to determine whether the batteries can be charged, and, if so, what specific charge algorithm should be used for charging the installed batteries. In this manner, the system may optimize the usable life of the installed batteries.

Additionally, the system's capability to identify the specific battery chemistry of the installed batteries allows the system to balance charge the specific battery type. Balance charging avoids the differential charging that results from charging batteries in series or parallel configurations. When multiple batteries are charged together, if their internal resistance is not precisely matched to one another, the battery with the lowest internal resistance accepts more current than the other batteries and therefore will charge faster than the other batteries. Over time, the differences between the batteries' charges can become large and the total charge of the group of batteries may be diminished. Balance charging, or charging one battery at a time to its full potential, avoids this issue. The present system is operable to balance charge a single battery installed in a battery receiver of the system (e.g., one battery slot of a plurality of battery slots in the system). The system is operable to recognize that a single battery has been installed and is operable to measure the individual voltage (or current) produced by the battery. The battery receivers may be configured into parallel configuration during the balance charge operation, allowing the single battery to be charged (e.g., if the battery receivers were configured in series, no complete circuit would be formed and no balance charging would be possible).

The system may include firmware and at least one microprocessor electronically connected and arranged such that the power generated by the one or more solar panels of the system can be monitored and allocated to optimize the performance of the system, including powering lighting elements in the system and charging external electronic devices. The electronic circuitry, firmware, and microprocessor of the present invention may control the solar power generated by the one or more solar panels, the power allocated to the lighting source, the charging and discharging of the batteries (which may be of varying chemistry), and the charging of an attached external electronic device in a novel way to create a home lighting and charging system that gives the consumer a flexible and consistent system that can power lamps (and other devices) and charge in various off-the-grid environments and situations. The system also provides substantial customizability in the components of the system to allow the user to adjust the system to his needs within the environmental, market, and economic constraints of a particular location.

As mentioned above, embodiments of the present invention may use solar panels as a power generation source. Certain semiconducting materials exhibit the photovoltaic (PV) effect of converting photons from the sun into the flow of electrons for use in electrical systems. PV materials may be configured in such a way as to create solar panels for the generation of electricity from solar radiation. The current and voltage generated by solar panel technologies are related to each other, but their relationship is highly non-linear. Thus, creating an operation point in which concomitantly generated current and voltage provides a maximum power point of operation (Power=generated voltage*generated current at that voltage) may provide for more efficient power generation. For instance, solar panels that are designed to charge 12V batteries have a maximum power point of approximately 17V. At 17V, a panel capable of producing 10 W will produce 0.59 A (17V*0.588 A=10 W). When the panel is not supplying any current (open circuit) the panel will produce 21.6V, but the power output is 0.0 W due to no current. When the panel produces its maximum current of 0.68 A, the voltage drops to a very low value, approximately 3V, thus producing only 2 W. Thus, it is desirable for the designer to provide a means to operate the panel at its maximum power point (MPP) whenever possible. FIG. 1 provides a graph of current-voltage curves for a 12V, 10 W solar panel at several temperatures (25° C., 50° C., and 75° C.). The current-voltage curves of FIG. 1 demonstrate both the MPP of solar panels at a given light level (standard test conditions: irradiance at AM 1.5, 1 kw/m$^2$) and the flexibility for harvesting current and voltage from the solar panel. For example, if more current is needed, more current can be drawn at the expense of a lower voltage. Such adjustments may be useful in non-optimal solar conditions. Under low light conditions, there may be insufficient current provided at the MPP to run lights and/or charge attached, external devices, and it may be advantageous to draw more current and lower voltage (e.g., move from the MPP to the left side of the current-voltage curve).

The system may include one or more solar panels that can be used to generate power for charging the batteries installed in the system, to run the lighting elements (e.g., LEDs) of the system and other devices (e.g., USB compatible devices), to charge a device (e.g., a mobile phone) connected to a USB port, to charge secondary batteries installed in the system, or combinations thereof. The firmware allows the microprocessor to automatically recognize the power available from attached solar panels and optimize the battery configuration (e.g., parallel or series), the solar power configuration (e.g., parallel or series), and/or the charge algorithm for optimum performance (e.g., the amperage applied to the batteries) based on the dynamically changing output of the solar panel (which varies depending on season of the year, weather, and environmental conditions: clouds, low-light conditions, etc.).

In some embodiments, the system may also include firmware and electronics capable of automatically adjusting the electronic arrangement of multiple solar panels (e.g., between series and parallel) and the output voltage to optimize the voltage available for charging of batteries installed in the system and the power supplied to devices connected to the system. While it is not required that multiple solar panels be installed in the system, the system is capable of connecting to multiple solar panels and manipulating the electronic configuration of the solar panels. The system may include a solar panel control logic circuit operable to switch a plurality of solar panels from parallel to series configuration and vice versa in response to a number of conditions in the system. For example, if there is a change in light conditions (e.g., the available sunlight is diminished due to an increase in cloud cover), the configuration of the solar panels may be changed from a parallel configuration to a series configuration in order to increase the total voltage produced by the solar panels. The solar panel control logic circuit may reverse the configuration back to a parallel arrangement if the solar conditions improve. Additionally, the solar panel control logic circuit may change the configuration of the solar panels from parallel to series if there are multiple simultaneous demands on the power generated by the solar panels, such as an external device (e.g., a mobile phone) plugged into a USB port of the system for charging while installed batteries are being charged. In response to the multiple demands on the system, the solar panel control logic circuit may configure the solar panels in a series configuration. The solar panel control logic may change the configuration of the solar panels in response to signals from the control processor of the system, which monitors voltage demands created by various elements in the system (such as the lighting elements, the batteries, and any connected external devices) through circuit connections to these elements, and analyzes the voltage demands created by these elements and signals the solar panel control logic to change the configuration of the solar panels between series and parallel based on the analyzed voltage and current demands.

In addition, this product allows the consumer to choose solar panels that best fit their needs, based on size, price, and performance, and for customization at the user's convenience. For example, the user may choose a smaller solar panel initially when the system is purchased based on the lower cost of the solar panel, and in the future may purchase a larger panel or an additional small panel when funds are available to increase the power available to the system. When changes are made to the system (e.g., one or more solar panels are added), the system automatically recognizes the power available from attached solar panel(s) and optimizes the battery and/or panel configuration (series or parallel) and charge algorithm for optimum performance based on the dynamically changing output of the solar panel. Also, the system may recognize fluctuations in the power output of the solar panel(s) that may result from solar conditions (e.g., changes in sunlight due to overcast conditions), and adjust the battery and/or solar panel configuration and charge algorithm to balance and optimize the output of the system (lighting and charging of electronic devices) and the charging of the batteries. If the solar panel(s) cannot produce enough current at its maximum power point to provide power for lighting and/or charging an attached electronic device, the unit will adjust its configuration to draw maximum current, and then automatically adjust the configuration again when the maximum power point can be maintained.

The system may use various kinds of lighting elements for providing light to the user, and may include multiple light emitters of the same or different kind. In some embodiments, the system may be limited to light emitting diodes (LED) as a light source. A light emitting diode draws a specific amount of current at a given voltage, where the higher the available supply of voltage, the more current the LED draws. The amount of light that an LED produces is a direct function of the amount of current going through it, yielding a relation to the voltage that is being supplied to it. When operated from battery power, the discharge curve of the battery needs to be accounted for; the more the battery discharges, the lower its voltage, and thus decreasing the amount of current going through the LED, and thus decreasing the amount of light that is produced by the LED. In addition, the life expectancy of a LED is determined by the amount of current going through the LED. If the current is below a certain threshold, the LED will last tens of thousands of hours. If the threshold is violated, the life the LED will be diminished. Also, LEDs have maximum current limitations, thus the amount of voltage that is supplied to them should be controlled in order to avoid damage to the LED.

For the foregoing reasons, it is advantageous to monitor and control the amount of current and voltage supplied to an LED. Pulse width modulation (PWM) may be employed to maintain constant current through a relatively broad range of supply voltages. The firmware may control the PWM of the power source that powers LED lamp, where the power source may be the batteries, the solar panel operating at its maximum power point, or from low wattage solar panels operating at the LED operating voltage. For example, when the unit is connected to one or more solar panels and the power provided by the solar panel(s) is sufficient to power the LED lamp, the batteries may be electrically isolated from the lamp so that lamp is operated from solar panel and not from batteries to save the batteries' charges. PWM can be used to maintain the average current going through the LED within a closed loop feedback system by adjusting the duty cycle of high-speed pulses of voltage. The average current over a period of many pulse cycles is calculated and maintained by the processor. However, the applied current is maintained below peak current of the LED, even if that peak is for a very short duration in the PWM cycle.

The solar panel may power the lighting elements (e.g., LED) directly, or through a step-down (buck) converter to step down the voltage and step up current. The solar panel may directly power the LED lamp if the solar panel's output is within the operating voltage of the LED. However, if the voltage of the solar panels is beyond the limit for the LED lamp set by the controller, the controller will isolate the solar panel(s) from the LED lamp(s) and power will be provided to the LED lamp(s) through a step-down convertor. In some embodiments, the controller firmware can determine the output of the solar panel and utilize MOSFET switching to change the power supply of the LED lamp from being directly from the solar panel(s) to being indirectly from the solar panels through the step-down converter.

The firmware may also direct that more current and less voltage is drawn from the solar panel. For instance, if the solar panel cannot produce enough current at its maximum power point to power the LED, the unit will adjust its configuration to draw maximum current, and then automatically adjust the configuration again when the maximum power point can be maintained (e.g., there is sufficient sunlight). To do so, the firmware controls MOSFET switching to isolate the circuitry load from the solar panel to allow the solar panel to recover to no-load voltage, and then configure circuitry to draw power from the solar panel at its maximum power point.

The electronics industry has developed standards for charging multiple device types using universal serial bus (USB) connections without requiring serial bus communications. Thus, items such as cellphones can be charged via the same connector as is used for serial communication. USB standards require 5.0V nominal voltage for the charging operation with varying degrees of supply current based on the specific standard and country for which the device is designed. Embodiments of the present invention may include one or more USB charge ports for charging external electronic devices. Various electronic devices are compatible with USB charge ports via a USB cable (e.g., Standard A USB, Standard B USB, Mini A USB, Mini B USB, Micro A USB, Micro B USB, Micro AB USB, 30-pin Apple device ports, 8-pin Apple device ports, UC-E6 plug, Nokia Pop-Port, HTC ExtMicro USB port, etc.). However, some devices (e.g., older cell mobile phone technologies, computers, etc.) may not be USB compatible or the user of the system may not have a USB adapter cable available for an external device. Thus, in some implementations, the system may alternatively or additionally include power outlets and charge ports of various designs (e.g., 12V vehicle charger, etc.).

Embodiments of the present invention may include a battery compartment that accepts multiple batteries (e.g., three, four, etc.) of a certain size (e.g., AA/14500 batteries). The system may be able to identify and accommodate rechargeable batteries of different chemistries (e.g., NiMH batteries, NiCad batteries, Li-Ion or $LiFePO_4$ batteries). The invention may accomplish the identification of the batteries through a machine state coding firmware algorithm in combination with battery switching logic that allows the installed batteries to be switch between parallel and series configurations according to signals from the control. The battery switching logic may utilize P type and N type MOSFETs for its switching function. For example, a firmware algorithm may include multiple voltage measurements of the batteries in series, parallel, and other arrangements (e.g., partial parallel arrangement) that allow the processor to determine the total voltage of the batteries in series, the voltage of the batteries in parallel, and other voltage measurements (e.g., measuring the voltage of the batteries through a reverse body diode of a normally open MOSFETs to determine whether they are all of the same chemistry type). The battery switching logic allows for the configuration of the batteries for the various voltage measurements needed to perform the battery identification tests. The battery switching logic may use MOSFET switching to change the configurations of the batteries. The voltage measurements and firmware algorithm together execute what amounts to a battery identification protocol that can determine the particular chemistry of the installed batteries: e.g., whether they are lithium ion batteries versus NiMH batteries (even though the output voltage of one lithium based battery can equal the output voltage of three NiMH batteries). Once the chemistry of the batteries is identified, the firmware may apply a charging algorithm for the installed batteries that is optimized for the charging profile of the particular battery chemistry.

Different batteries require different charge algorithms. For example, some battery chemistries require a preparatory or slow charge, then an accelerated charge rate, then a very low trickle or maintenance charge. Other types require a constant current until a specific voltage is reached, and then a specific time at a constant voltage. The ability to identify the specific chemistry of the battery allows the user to operate the system with batteries having different chemistries, giving the user flexibility if the availability of rechargeable batteries is limited (e.g., there is only one type of battery available). The system may extend or maximize the life of the chosen batteries by identifying the type of chemistry of the installed batteries and then using the specific charge algorithm that optimizes the life of the battery. The system also allows for balance charging of specific battery types, as mentioned above.

The firmware may also allow the processor to identify whether batteries having different chemistries (e.g., installing 2 NiCad and 1 $LiFePO_4$ batteries) have been installed in the battery compartment together. To determine when batteries of different chemistries are improperly installed, the microprocessor may compare the voltage of batteries in series compared to 3x voltage in parallel (fault if series is greater or less than 3× parallel, +/−0.3V). Another method that may be used to determine whether batteries of mixed chemistry are simultaneously installed is to measure voltage output of the batteries in a partial parallel configuration in which both normally open (NO) and normally closed (NC) transistors used to switch the batteries between series and parallel configurations are in the open condition, allowing voltage to pass through the transistors only through body diodes associated with each. If the voltage difference measured using this method is less than a predetermined value (e.g., 0.4V) the system may determine that the batteries are of mixed chemistry. The system will not charge the batteries if it detects mixed chemistry batteries in the battery compartment, as to not damage the batteries, but may draw power from the batteries to allow the lighting element(s) to provide light, for as long as the batteries can supply enough power.

The firmware algorithm and MOSFET switching can also determine when primary batteries (non-chargeable batteries) are installed based on battery voltage and battery temperature, allowing for operation of the lamp while preventing the charging of the primary batteries. The temperature of the batteries may be monitored by the microprocessor when a voltage is applied to the batteries (e.g., using a thermistor located near the battery compartment). If the temperature rises beyond a predetermined threshold, the microprocessor will classify the installed batteries as primary batteries and no charging will be applied to the batteries.

The system may also include specific circuitry to prevent excessive inrush current while batteries are being installed, allowing for installation of multiple batteries in any order, and to prevent excessive inrush current while batteries are switched from parallel to series and series to parallel.

In some embodiments, the system also automatically adjusts through the use of firmware logic and electronics the configuration of multiple batteries and/or attached power devices (e.g., solar panels) to optimize (1) the battery discharge for powering LED lights and, in some instances, a USB charge port, (2) the battery charging based on the power output available from one or more solar panel(s), and (3) solar panel powering of the LED or the USB port when the batteries are fully charged. The optimization may result in longer charging time for the batteries if, e.g., the solar panel has a low output (e.g., a 3 W panel or the panel is in low-light conditions) and the charging algorithm is accordingly changed (e.g., lower amperage is applied to charge the batteries), or if the solar panel is simultaneously powering the LED light(s) and charging the batteries. For the latter situation, the system may use PWM operation to power the LED light(s) operation and may compensate for a drop in power to the LED light(s) due to simultaneous battery charging (or light conditions) and may extend the pulse width to obtain the required current to achieve the desired brightness of the LED lamp. In some embodiments, and without limitation, the system may restrict the operation of the LEDs during battery charging in a reduced power mode (e.g., the solar panel power output is reduced due to cloud cover or other conditions). There is a possibility of high voltage spikes going to the LEDs in such situations (e.g., a cloud cover passes), and because of the very sensitive nature of LEDs to over-voltage, this protection may prolong the life of the LEDs and reduce the risk of failure of the system.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 14 is a table showing performance data for batteries of different chemistries under various conditions utilized within a system of the present invention. Different configurations (e.g., series or parallel) may be utilized by the system of the present invention to change the power applied to the batteries, and the power drawn from the batteries.

DETAILED DESCRIPTION

Figure 1:
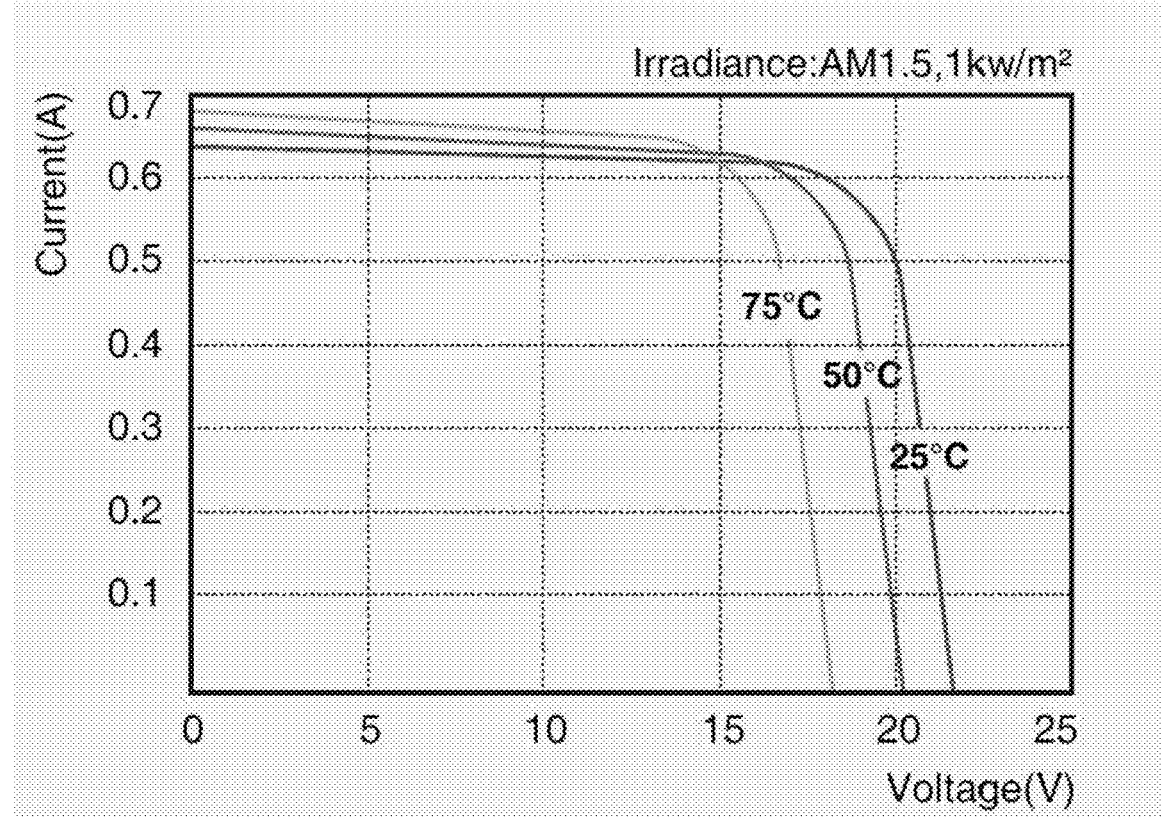
FIG. 1 is a graph demonstrating power (current-voltage) curves for a for a 12V, 10 W solar panel at several temperatures (25° C., 50° C., and 75° C.).
Figure 2:
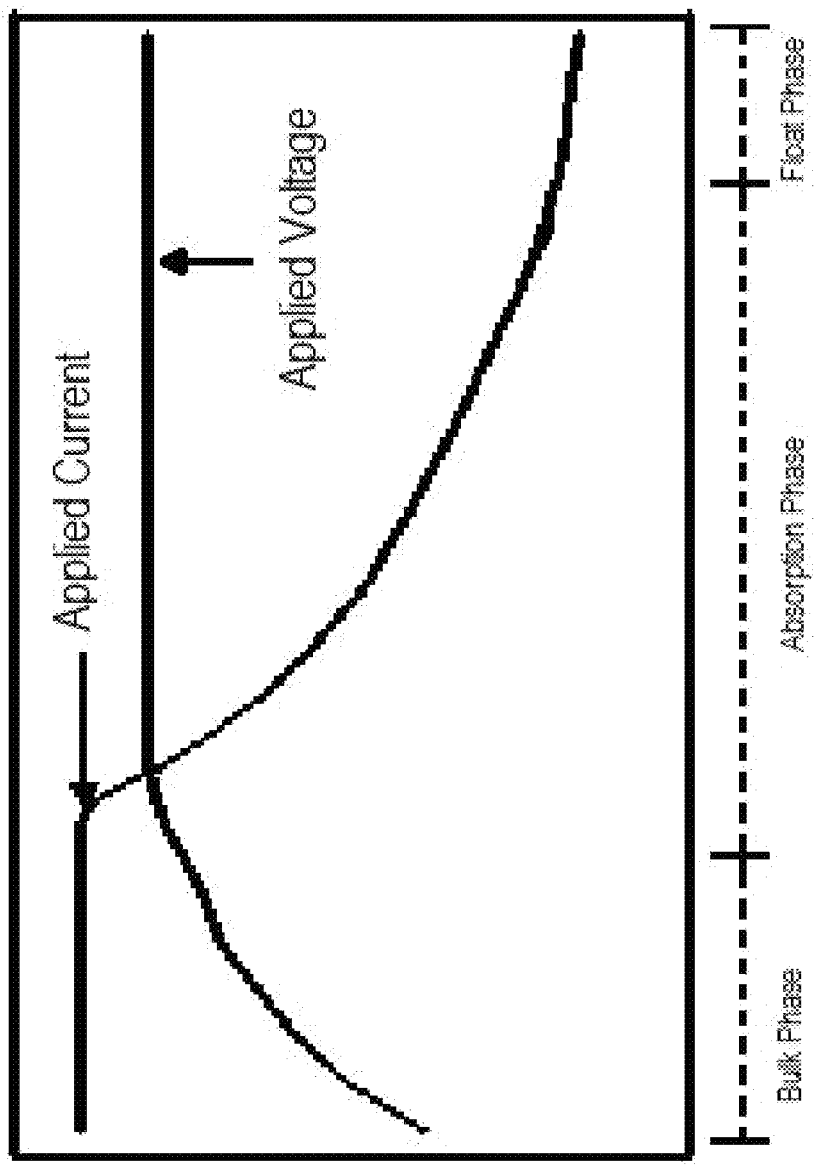
FIG. 2 is a graph demonstrating the applied current and voltage profiles of lithium ion battery during a charging operation.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns novel lighting and charging system that may be used in areas that have an unreliable or absent electrical power grid. The system may include inter alfa one or more electric power generation devices or "power devices" (e.g., solar panels, thermoelectric generators, etc.), one or more light emitters (e.g., LED lights), a battery compartment or connectors for receiving and/or connecting one or more batteries (e.g., AA/14500 size batteries, 12V batteries, etc., which may be of various chemistries), one or more ports for charging external electronic devices (e.g., mobile phones, etc.), and microprocessor firmware and series-parallel switching circuitry connecting the batteries and/or the power generation devices. The firmware and series-parallel switching circuits of the batteries and/or the power generation devices may allow the system to (1) accept batteries of different chemistries and utilize the batteries to run one or more light emitters connected to the system and/or charge and external electronic device connected to the system, (2) automatically identify the battery chemistry of batteries installed in the system and adjust a charge algorithm for the batteries, (3) determine whether the batteries installed in the system are of mixed chemistry (e.g., multiple battery types installed in the system simultaneously), (4) automatically adjust the configuration of multiple batteries between series and parallel to optimize the battery discharge for powering the LED lights, and, in some cases, powering a USB charge port directly from the multiple batteries, (5) automatically optimize the battery charging, in some cases, while powering a USB charge port based on power output from one or more power generation devices, (6) switching power sources (e.g., between power generation devices and batteries) for external electronic devices plugged into the system and/or the light emitters, based on, e.g., the output of the one or more power generation devices, (7) automatically recognize the dynamically changing power available from attached power generation devices, (8) automatically adjust the configuration of multiple batteries between series and parallel configurations to optimize the battery charging based on the dynamically changing power available from attached power generation devices (e.g., solar panels), and (9) automatically adjust the voltage supplied by the one or more power generation devices to the one or more light emitters and/or an external electronic device depending on the current/voltage balance needed for the light emitters and/or external electronic device, among other beneficial functions.

The presently disclosed system may allow the user to operate the product by installing sets of different types of secondary (rechargeable) batteries based on the purchaser's individual needs and the availability of replacement batteries. To prevent damage from incorrect battery types being installed, this invention includes safeguards to protect the device from incorrect batteries types, while still allowing operation of the lamp even with incorrect types being installed. In addition, the life expectancy of the chosen batteries are maximized for each battery chemistry by the unit automatically discerning the type of chemistry that was installed and then using the specific charge algorithm that optimizes the life of the battery. For example, using a series of voltage measurements taken from a series of configurations of the batteries, the microprocessor may determine that lithium ion batteries are attached to the battery connectors (e.g., installed in a battery compartment) and classify the installed batteries as lithium ion and store the classification in a memory unit. The microprocessor may continue to take voltage readings from the batteries to determine their state of discharge, and determine when charging is required. For example, a charging operation may be initiated at a predetermined threshold of charge depletion (e.g., a threshold between about 20% and 80% depletion, such as about 20% depletion, about 30% depletion, about 40% depletion, about 50%, etc.). The amount of voltage and current supplied to the batteries during the charging operation will be determined by the battery charging logic of the microprocessor, which takes into account the state of charge depletion of the batteries, the power available from the power generation device(s) connected to the system, and the charging algorithm of the particular chemical class of the installed batteries. When the microprocessor determines that a charging operation is necessary, the microprocessor will apply current and voltage to the batteries according to a charging algorithm specific to the classification (e.g., the lithium ion chemistry) of the installed batteries, including bulk, absorption, and float charging phases. As an example, FIG. 1 provides a graph of a charging profile of a lithium ion battery, including the bulk, absorption, and float charging phases. Charging profiles for other battery chemistries (e.g., NiMH, NiCd, lead acid, gel, LiFePO$_4$, etc.) are known to those skilled in the art, and thus one of ordinary skill in the art.

The present system also allows for balance charging of a single battery of a specific battery type according to a charging algorithm of the installed battery (e.g., one battery slot of a plurality of battery slots in the system). Balance charging, or charging one battery at a time to its full potential, allows the battery to be charged to its full capacity (whereas when batteries are charged simultaneously the internal resistance of the batteries may vary, resulting differential charging of the batteries). The system is operable to recognize that a single battery has been installed, switch the battery receivers into parallel configuration (e.g., if the battery receivers were configured in series, no complete circuit would be formed and no balance charging would be possible), and then measure the individual voltage (or current) produced by the battery (e.g., a voltage over about 3.6 V indicates a Li-ion battery, a voltage between about 3.6 V and about 1.4 V may indicate a LiFePO$_4$ battery, and a voltage of about 1.4 V may indicate a NiMH battery). Once the battery type is identified, the microprocessor will apply the charging algorithm specific to the particular battery type to thereby charge the battery to its full capacity.

In some embodiments, the presently disclosed system allows the user to choose which size of solar panel best fits their needs (e.g., based on price, performance, etc.) and allows for future upgrade of the system to produce more power by allowing the installation of additional and/or larger solar panels. The system may automatically recognize the power available from attached solar panels and optimize the battery configuration and/or a battery charging algorithm for optimum performance based on the dynamically changing output of the solar panel. If the solar panel cannot produce enough current at its maximum power point to power an attached external device and/or light emitter, the unit may adjust its configuration to draw maximum current, and then automatically adjust the configuration again when the maximum power point can be maintained.

Figure 3:
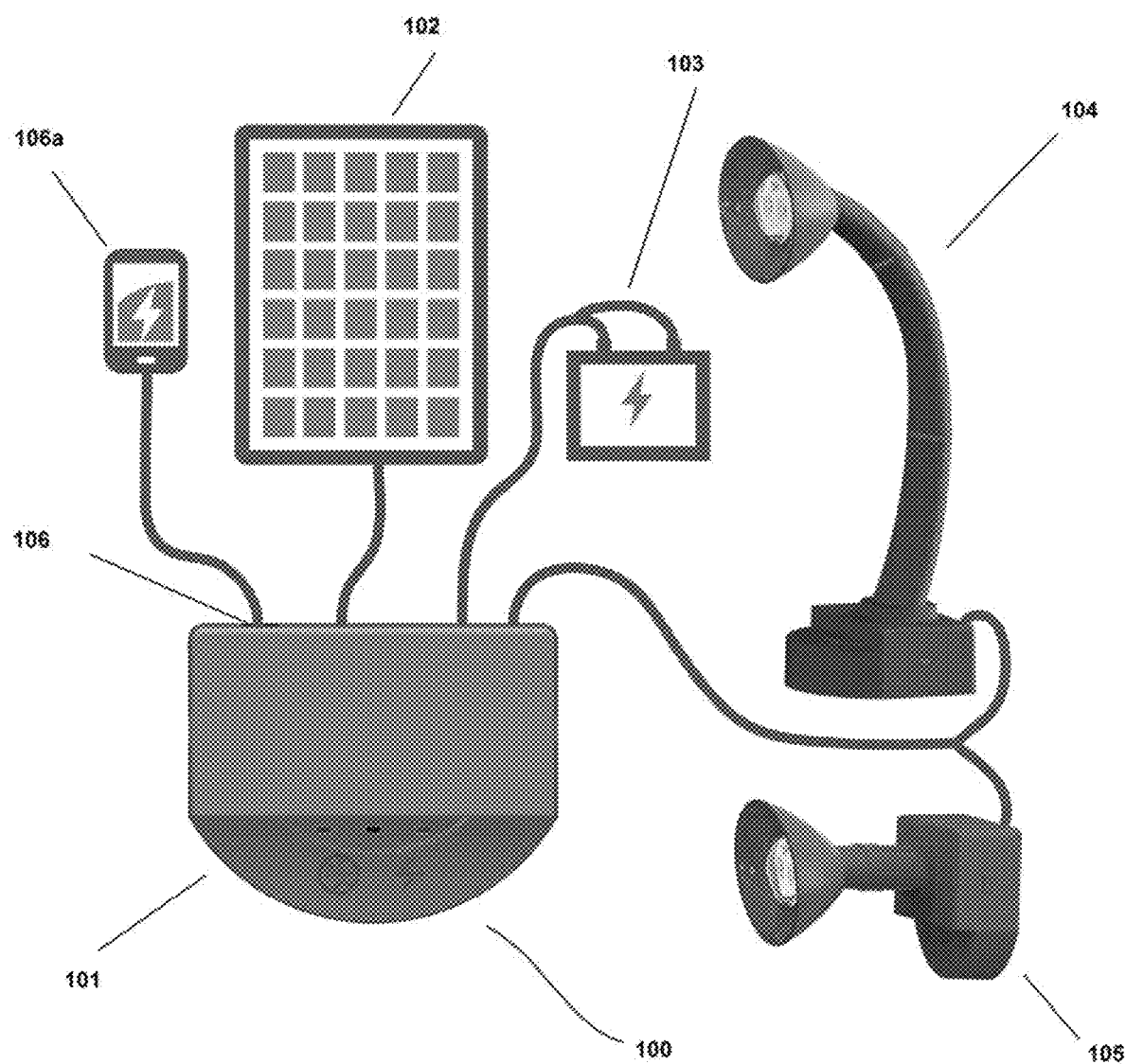
FIG. 3 is an exemplary embodiment of a lighting/recharging system according to the present invention.

FIG. 3 provides a view of some of the exemplary elements of a system according an embodiment of the present invention. The exemplary system 100 may include a controller 101, a solar panel 102, at least one battery 103, a table lamp 104, a wall or ceiling lamp 105, and a charging port for an external electronic device 106a (e.g., a mobile phone). The controller 101 may be in electronic communication with the other elements of the system, and may include a microprocessor having firmware logic capable of (1) monitoring the power (voltage and current) produced by the solar panel 102, (2) monitoring the power (voltage and current) available in the battery 103, (3) performing voltage test operations to determine the type of chemistry of the attached one or more battery(ies) 103, and (4) controlling and adjusting the current and voltage supplied to the lamps 104 and 105 and the external mobile device 106a and the one or more batteries 103 during a charging operation according to a charging algorithm. The system 100 is a customizable system to which various elements may be added (e.g., additional solar panels) and from which elements can be removed (e.g., one of the lamps may be removed).

Figure 4:
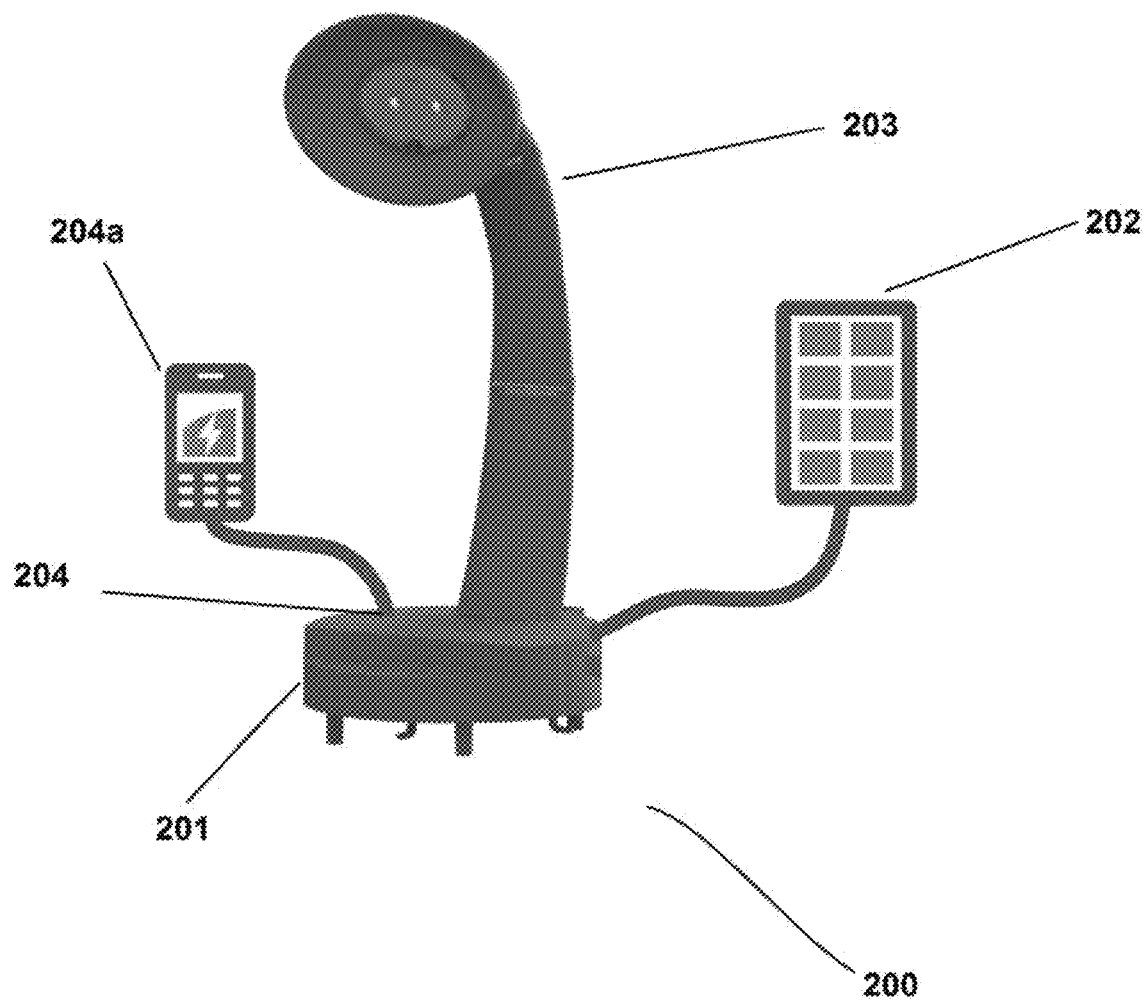
FIG. 4 is another exemplary embodiment of a lighting/recharging system according to the present invention.

FIG. 4 provides a view of some of the exemplary elements of a second example combination of elements. The exemplary system 200 may include a base 201 that houses controller, one or more solar panels 202, a lamp 203, and one or more charging port(s) 204 for electronic device(s) 204a. The base 201 may contain a battery receiver (e.g., a compartment) for accepting batteries of a particular size (e.g., AA/14500 size batteries, etc.), which may accept both primary and secondary batteries of the particular size. The controller may be in electronic communication with the other elements of the system (the solar panel 202, the lamp 203, and the charging port 204), and may include a microprocessor having firmware logic capable of (1) monitoring the power (voltage and current) produced by the one or more solar panel(s) 202, (2) monitoring the power (voltage and current) available in the one or more batteries, (3) performing voltage test operations to determine the type of chemistry of the installed batteries, (4) controlling and adjusting the current and voltage supplied to the lamp 203 and the external mobile device 204a and the one or more batteries during a charging operation according to a charging algorithm. Once the microprocessor has identified the battery chemistry of the one or more batteries installed in the system, it is operable to classify the batteries according to their voltage and select a charge algorithm to apply to the batteries during a charging operation that accommodates the particular battery chemistry. If batteries of mixed chemistries or primary batteries are installed in the compartment, the microprocessor may prevent the batteries from being charged and just use the power available from the batteries until they are drained. The system 200 is a customizable system to which various elements may be added (e.g., additional solar panels) and from which elements can be removed (e.g., one of the lamps may be removed).

Figure 5:
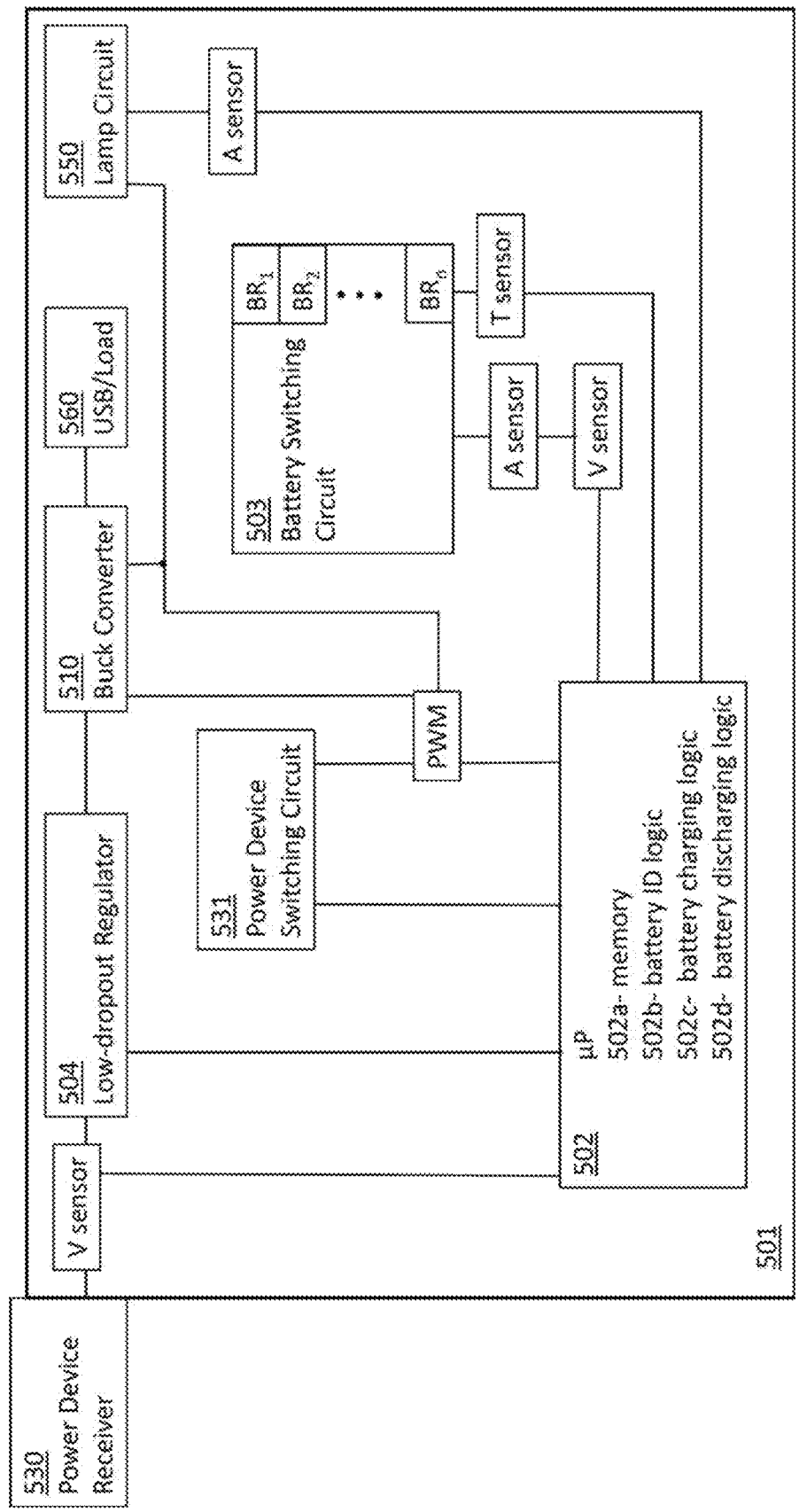
FIG. 5 is a generalized system layout of the electronic components of a lighting/recharging system according to an embodiment of the present invention.

FIG. 5 provides a diagram overview of the electronic system of a lighting/charging system 500 according to an embodiment of the present invention. The system 500 includes a controller unit 501 in which a microprocessor 502 and most of the operative electronics of the system may be housed, a solar input 530, one or more USB output for powering external electronic devices (e.g., a mobile phone), and a lamp circuit for receiving and powering one or more lamps (e.g., LED lamps). The microprocessor 502 may be manufactured with firmware logic that receives inputs (voltage and current signals) from a number of points in the electronics of the system. The microprocessor 502 may include firmware logic that receives signals from a battery circuit 503 providing voltage readings from one or more batteries installed in battery receivers ($BR_1$, $BR_2$ ... $BR_n$) in the battery circuit 503. The microprocessor may take multiple voltage readings from the battery receivers with the batteries in various configurations (e.g., parallel, series, and open circuit configuration in which current is able to flow through body diodes only, etc.). The microprocessor may also be electronically connected to the transistors within the battery circuit that allows the microprocessor to switch the condition of the transistors (e.g, MOSFETs) within the battery circuit 503 to thereby switch the configuration of the one or more batteries in the battery circuit between parallel, series, and other configurations. The microprocessor includes battery switching/identification logic firmware 502b that enables the microprocessor to switch the configurations of the batteries and determine the type of battery installed in the system based on the voltage readings taken within the battery circuit when the one or more batteries are in the different configurations. Once the microprocessor identifies and classifies the type of batteries that are installed in the battery receivers, the microprocessor stores the battery identification in a memory 502a.

The microprocessor 502 may also include a battery charging logic 502c. The battery charging logic may interpret voltage readings from the installed batteries in view of prior classification of the batteries to determine when a charging operation to recharge the installed batteries should be performed. The battery charging logic 502c may then apply a charging algorithm to the installed batteries that is selected based on the classification of the installed batteries stored in the memory 502a. The voltage of the installed batteries and current levels going through the installed batteries are monitored during the charging operation, and once the voltage readings from the battery reach a termination threshold set in the battery charging logic 502c, the batteries will have reached full charge, and the charging operation is terminated.

During charging operation, the microprocessor may apply current to the batteries through pulse width modulation (PWM) in order to control the average current applied to the batteries during the charging operation. As shown in FIG. 5, PWM is utilized to regulate current being supplied to the batteries whether charge is being supplied directly from the external power device(s) (e.g., solar panels) or through a voltage step-down (buck) converter 510. The current supplied to the batteries during a charging operation is variable depending on (1) the classification of the installed batteries and (2) the phase (such as bulk, absorption, or float) of the charging operation. Additionally, the direct source of the current (the power device or buck converter) may change depending on the charging phase and the amount of current provided by the power device(s). For example, during bulk phase charging when relatively high current is required and when the power device can supply ample current, such as when a solar panel is operating at the maximum power point (MPP), the power may be supplied through the buck converter 510, but when conditions occur that reduce the amount of power from power device (such as clouds covering the solar panel), the power may be supplied directly from the power device to harvest the maximum amount of energy.

The microprocessor 502 may be in electronic communication with one or more transistors (e.g., MOSFETs) in the power switching circuit 531. The power switching circuit may include one or more transistors (e.g., MOSFET, BJT, etc.) and other electronic devices (e.g., Schottky diodes, etc.) to (1) prevent current inrush into the batteries of other sensitive components of the system, (2) provide current and voltage signals to the microprocessor, and (3) allow the microprocessor to control the routing of current to different points within the controller 501 based on (1) the amount of power supplied by the external power device(s), (2) whether the batteries are in a charging operation, and (3) the other power demands of the circuit (e.g., lighting and/or USB device charging). The power switching circuit 531 may route power from the power device(s) to the buck converter 510 or battery circuit 503 as directed by the microprocessor 502.

The controller 502 may include a low-dropout regulator 504 that is connected to both the battery circuit 503 and the power switching circuit 531 and provides power to the microprocessor at a predetermined value (e.g., 2.5 V) when power is supplied to the controller 501 by either the external power device(s) or installed batteries.

The buck converter 510 supplies power to the USB system and the lamp circuit 550 at a stepped-down, predetermined voltage (e.g., 5V). The USB system includes a current limiting power switch that supplies current and voltage to one or more USB plugs in the USB system at the predetermined USB standard voltage and current. The current to the lamp circuit is regulated by the microprocessor 502 through PWM, as shown in FIG. 5. The lamp circuit 550 must be maintained below a maximum current to prevent damage to the light emitters (e.g., LEDs) electrically connected to the lamp circuit.

The battery circuit of the present invention (e.g., 503 in FIG. 5) may have a design that allows the configuration of the batteries to switched between series, parallel, and other configuration in order to allow the system (1) to run voltage tests in various configurations to determine the type of battery(ies) installed in the system, (2) to allow the system to perform various charging algorithms on the installed batteries (e.g., balance charging, charging multiple batteries of the same type at once), (3) to adapt to the power available from the power devices during a charging operation (e.g., switching to a series configuration when lower power is provided by solar panels due to light conditions), and (4) to adapt to power demands on the system (e.g., lighting and/or USB charging demands).

Figure 6:
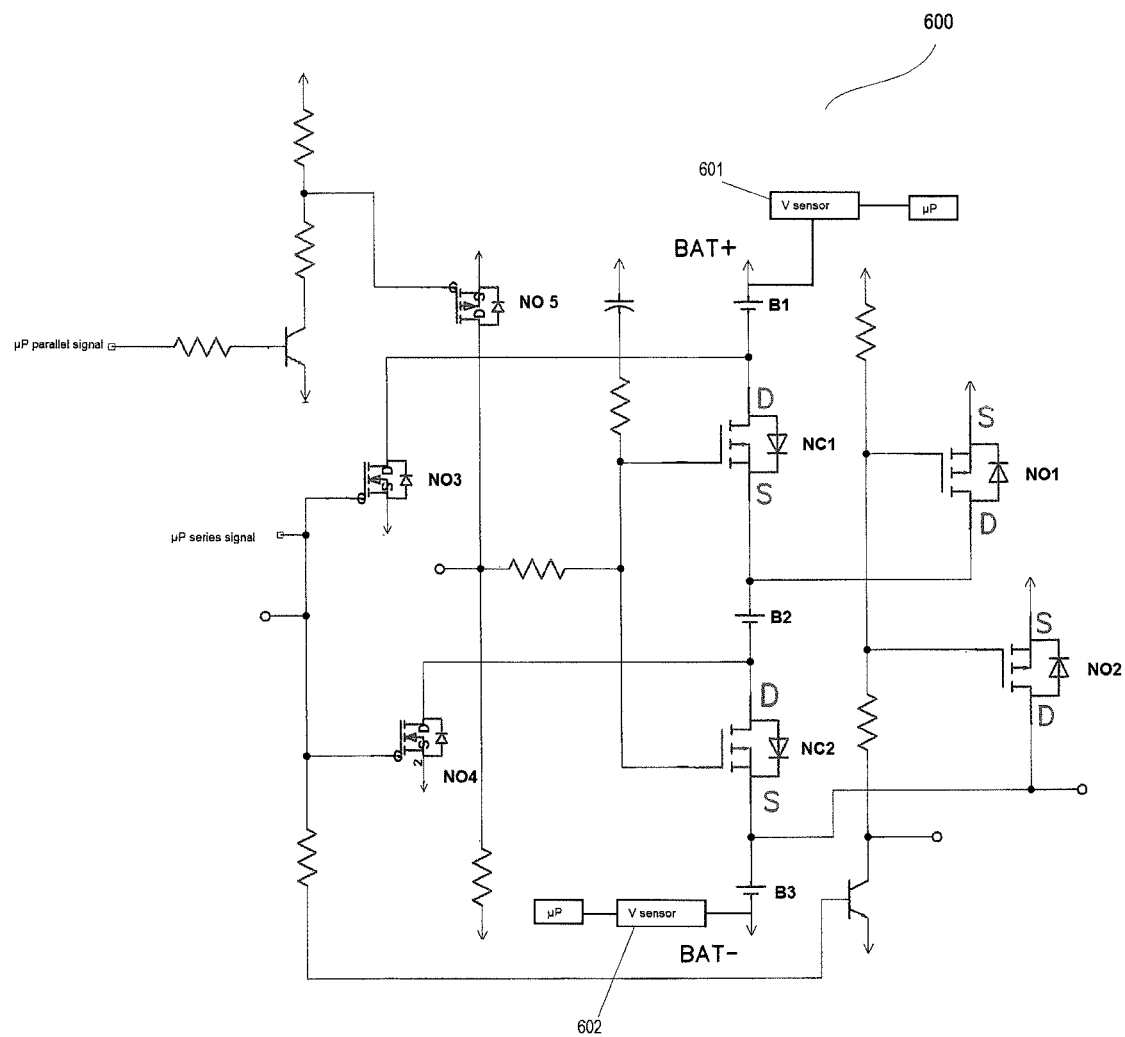
FIG. 6 is a generalized layout of the electronic components of a battery switching circuit according to an embodiment of the present invention.

Without limiting the invention, FIG. 6 provides a generalized example of a battery circuit 600 according to an embodiment of the present invention. The battery circuit 600 includes three batteries $B_1$, $B_2$, and $B_3$ that are in electronic communication with six transistors (e.g., MOSFETs) that are operable to switch the battery configuration between series, parallel, and other configurations at the direction of the microprocessor μP. It is to be understood that the battery circuit is generalized and that it may include various other devices and that there may be additional devices and circuitry between the transistors and the microprocessor μP. The transistors may include two normally closed transistors $NC_1$ and $NC_2$ that conduct under default conditions, placing the batteries in a series configuration, and four normally open transistors $NO_1$, $NO_2$, $NO_3$, and $NO_4$ that are open and do not conduct under default conditions. The normally closed transistors may be switched to an open condition together by the microprocessor μP by a first set of signals. The normally open transistors may be switched to a closed condition together by the microprocessor μP by a second set signals after the normally closed transistors are switch to open by the first set of signals. The result of the first and second sets of signals is that the battery circuit is placed in the parallel configuration, placing the batteries in parallel.

The battery circuit also includes sensors therein in electronic communication with the microprocessor μP that enable the microprocessor to measure voltages and/or currents within the battery circuit when the battery circuit is in various configurations. For example, the battery circuit 600 includes voltage sensor 601 at the positive end of the battery circuit and voltage circuit 602 at the negative end of the circuit, each of which transmit voltage data to the microprocessor μP. The battery circuit 600 may include additional sensors at additional positions to measure voltage and/or current. Battery identification logic of the microprocessor μP may analyze the data provided by the voltage sensors 601 and 602 (and/or other sensors in the battery circuit) when the batteries are in series, parallel, and other configurations in order to determine (1) how many batteries are installed in the battery circuit, (2) whether the batteries are of the same type or mixed chemistry, and/or (3) the particular type of battery (ies) that have been installed.

For example, and without limitation, the battery identification logic may run up to three tests when one or more batteries are installed in the battery receivers of the battery circuit. Firstly, when a battery is installed, its voltage may be measured by one or more voltage sensors in the battery circuit. If that voltage is then raised by at least a certain amount (e.g., 1.1V), the unit then discerns that a second battery has been installed. If that voltage is then raised again by at least a certain amount (e.g. 1.1V) then the unit knows that a third battery has been installed. Based on the counting of the amount of batteries and their total voltage (the default configuration of the circuit may be in series), the unit determines the type of battery. Available battery types, may be NiMH (1.2V nominal), or non-rechargeable Alkaline (1.5V nominal) or mixed chemistry, or LFP (3.2 V nominal) or Li-Ion (3.7 V nominal). Because three LFP batteries at nominal voltage can be the same voltage as two fully charged Li-ion batteries in combination with one fully charged NiMH battery, all in series, the battery identification logic performs additional tests to differentiate between different battery chemistries.

If the battery identification logic determines that there are three batteries, the microprocessor records in memory the total voltage of the three batteries in series. If the battery identification logic determines that the total voltage of the three batteries is higher than a pre-determined threshold (e.g., 4.29V, the maximum limit for three fully charged NiMH batteries in series) then the microprocessor may send a first set of signals that signal the $NC_1$ and $NC_2$ transistors to open. Both the normally closed and the normally open transistors of the battery circuit are open after the first set of signals is sent and the $NC_1$ and $NC_2$ transistors are opened, while the normally open transistors have not been closed. This condition may be referred to herein as "partial parallel" configuration. In the partial parallel configuration, the circuit may be completed through reverse body diodes in the normally open transistors (e.g., MOSFETs), which typically cause a drop in measured voltage (e.g., a drop of about 0.5 V) of the batteries, and the resulting voltage is analyzed by the battery identification logic and recorded in the memory of the microprocessor. Subsequently, the microprocessor may send a second set of signals to the normally open transistors $NO_1$, $NO_2$, $NO_3$, and $NO_4$ to their gates and close the transistors, causing the battery circuit 600 to be in full parallel configuration. The battery identification logic analyzes the resulting voltage of the battery circuit 600 in the parallel configuration and the voltage data is recorded in the memory of the microprocessor.

Once the voltage data is taken in the series, partial parallel, and parallel battery circuit configurations, the battery identification logic of the microprocessor then completes a first test by comparing the series voltage to the fully parallel voltage. If the voltage in series is three times larger (+/−0.3V) than the measured voltage in full parallel configuration, then all three batteries are of the same type and they are recorded as lithium based, and the classification is recorded in the memory of the microprocessor (in this example a 3× comparison is used because there are three batteries, in other embodiments, the series parallel comparison may use a different comparison standard, and the +/−0.3V is used because of the measurement accuracy of this embodiment, in other embodiments, the acceptable voltage tolerance may be different). If the calculation results in a different of outside of the +/−0.3 V tolerance, the batteries are classified as mixed chemistry.

Additional tests are subsequently performed because of possibilities that the installed batteries are actually a combination of charged and depleted LFP and Li-ion batteries that can pass the first test above. A second test may be performed using data recorded in the partial parallel configuration. The voltage of the three installed batteries tend to equal one another in the partial parallel configuration, but because the voltage measurements taken in the partial parallel configuration are taken through the reverse body diodes of the normally open transistors, the average voltage drop of the installed batteries is significantly less than the predetermined value (e.g., 0.5 V) expected for charged batteries of the same chemistry when batteries of different individual voltages are installed. If the difference between the measured voltages of the installed batteries in the partial parallel configuration and the fully parallel configuration is greater than or equal to a pre-determined threshold (e.g., about 0.4V), the batteries are determined by the battery identification logic to be of the same type and classed as Li based. If the difference is less than the pre-determined threshold, the batteries are classified as mixed chemistry. The classification of the batteries is recorded in the memory of the microprocessor (in other embodiments the 0.4V may differ based on the actual MOSFET transistors that are used).

When the battery identification logic classifies the installed batteries as mixed chemistry, the battery switching logic configures the battery circuit 600 in series. Additionally, the microprocessor may configure the power switching circuit to route the power produced by the batteries through the buck converter, and power may be provided to the lamp circuit through the buck converter to avoid any damage to light emitters (e.g., LED lamps) that may be connected to the lamp circuit. Additionally, the microprocessor may configure the power switching circuit to route any power produced by the power devices to the low-dropout regulator and the buck converter, and disconnect the battery circuit from any direct connection to the power devices to prevent damage to the installed mixed chemistry batteries.

When the batteries are classified as Li-based, the type of lithium battery is determined by the battery identification logic through analysis of the total voltage of the installed batteries (Li ion batteries have higher voltage than $LiFePO_4$ batteries). However, because depleted Li-ion batteries can have the same voltage as charged $LiFePO_4$ batteries, another test may be performed during charging to determine whether the installed batteries are Li-ion or $LiFePO_4$ batteries. Li-ion batteries have a much faster rise in voltage over a given time (dV/dT) when the voltage of the batteries is 3.5 V, in comparison to LiFePO$_4$ batteries when their voltage is approximately 3.5. Thus, if the batteries are classified as LFP, and during charging the dV/dT of the battery at 3.5V matches that of Li-Ion, then the batteries are automatically re-classed as Li-Ion, yielding no damage to the batteries and allowing them to be fully charged.

The voltage of NiMH and primary (e.g., alkaline) batteries are also similar and tests of voltages of the installed batteries in multiple battery configurations may not reveal whether the installed batteries are primary, NiMH, or a mixture of both. Thus, the battery identification logic also monitors one or more temperature sensor (see, e.g., a thermistor—see the T sensor in FIG. 5) located at or near the battery receivers. If depleted non-rechargeable primary batteries are installed and are classified as NiMH, when a charging operation begins, the primary batteries will immediately heat up to a temperature above a pre-determined threshold, thus triggering the temperature sensor(s), which transmit a signal to the battery identification logic. The battery identification logic subsequent classifies the batteries as primary/mixed chemistry, and the microprocessor sends signals to the power switching circuit to terminate the charging operation.

The battery circuits of the present invention may also be utilized to balance charge the installed batteries individually. Due to possibly differing internal resistance in secondary batteries (Li ion, LiFePO$_4$, etc.) of the same chemistry installed in the battery receivers, the installed secondary batteries may take charge at different rates. Because these batteries can be charged thousands of times, the difference in charging rates between the batteries may over time lead to one or two of the batteries being significantly undercharged after the charging operation, thus limiting the total amount of charge that can be held by the installed batteries. To prevent or correct unbalanced charging of the installed batteries, a balance charging operation may be performed by the microprocessor and battery circuit. The balance charging operation is accomplished by charging one battery at a time. In some embodiments, and without limitation, the balance charge operation may be initiated by the user of the system by installing a single battery into a first battery receiver. As discussed above, when one battery is installed into a battery receiver its voltage is measured. When an external power is supplied to the battery circuit during a charging operation, the unit will try to charge the battery. But since the other two battery holders do not have batteries in them, no current will pass through the battery and therefore no current or voltage will be sensed by the microprocessor at the negative end of the battery circuit. In such cases (where a battery voltage is measured at a battery receiver, but no current flows to the negative terminal of the battery circuit), the battery switching logic will change the circuit configuration to full parallel to allow current to flow through the installed battery and to the negative end of the battery circuit. The battery identification logic is then enabled to identify the type of battery through voltage and the dV/dT measurements as described above.

In addition to providing novel benefits for charging of installed batteries, the battery circuit, microprocessor firmware, and additional electronic devices of various embodiments of the present invention also provide benefits in managing the discharge of installed batteries and management of power supplies to the lamp circuit and USB charging system. The configuration of the batteries are controlled by the battery discharge switching logic based on the amount of voltage and current available from the batteries and the power demands on the system (e.g., powering one or more lamps connected to the lamp circuit, and/or one or more external electronic devices plugged into the USB charging system). The configuration of the batteries depends on the type of batteries installed in the system. For example, if NiMH batteries are installed, the batteries are maintained in the default series configuration because of the relatively low voltage and current provided by the NiMH batteries. If Li-ion batteries are installed in the system, the microprocessor may sense the high voltage provided by the batteries in series and the battery discharge switching logic may direct the battery circuit to reconfigure the installed batteries in parallel thus maximizing the amount of time that the batteries can power the lighting elements because of reduced current draw from each battery. Additionally, Li-ion batteries may be switched to series so the power supplied by the batteries may be supplied to the USB charging circuit through the buck converter and to the lamp circuit through the buck converter in order to regulate the supplied current.

In other embodiments of the invention, and without limitation, both the installed power generation units (e.g., solar panels) and the installed batteries may be controlled by the microprocessor to be switched between series and parallel configurations to adapt to the fluctuations in the power supplied by the power generation devices (e.g., fluctuations due to solar conditions) during a charging operation or for powering a lamp circuit or external electronic devices connected to the system, and to adapt the power available from the batteries, e.g., for maximizing the operation time of the lamp circuit or to support multiple simultaneous power demands on the system (e.g., charging an external electronic device through the USB charging system while providing power to the lamp circuit for running one or more lamps connected to the lamp circuit).

Figure 7:
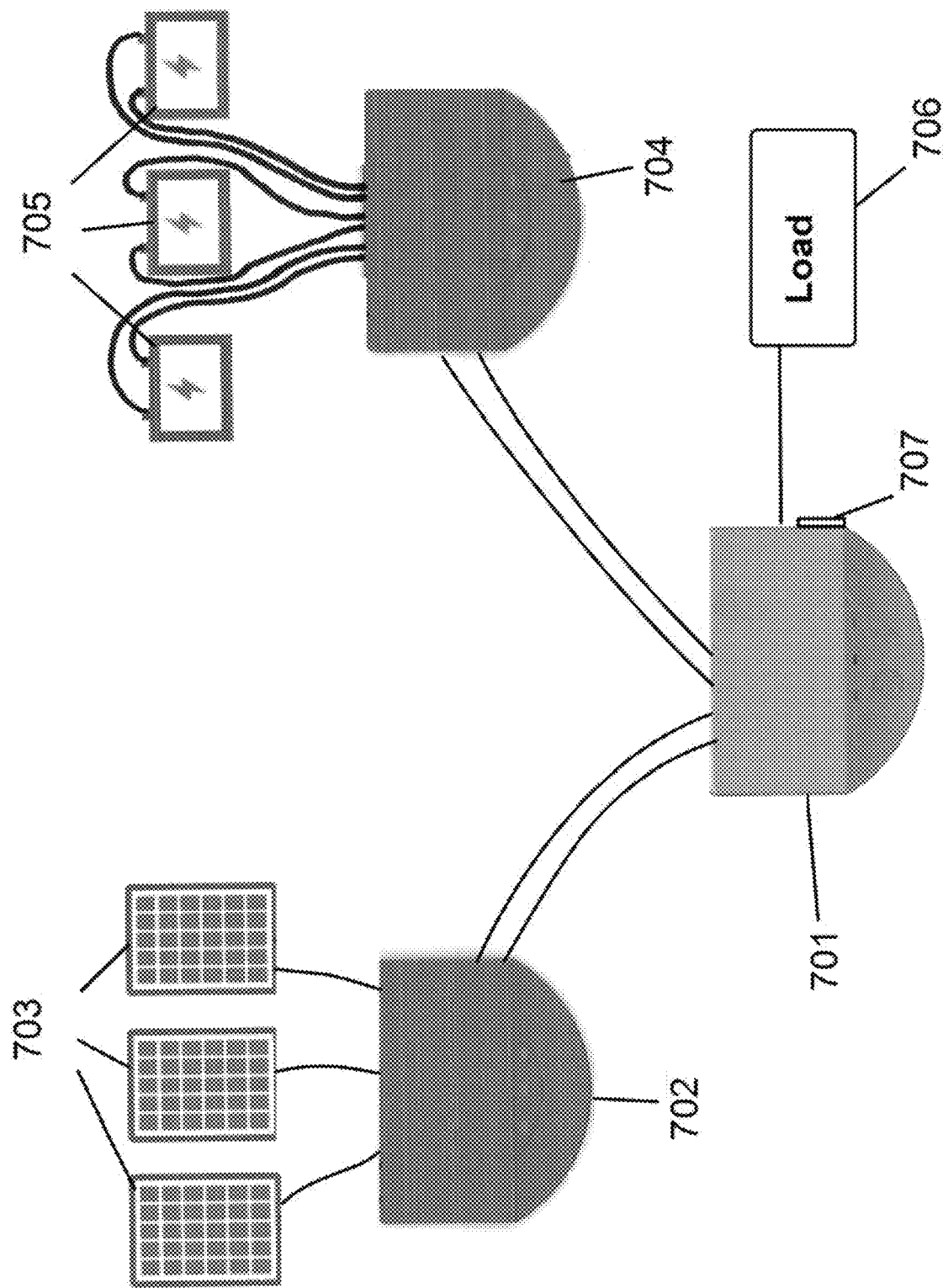
FIG. 7 is another exemplary embodiment of a lighting/recharging system according to the present invention.

Without limiting the invention, FIG. 7 provides an example charging/lighting system 700 overview. The system 700 includes a controller system 701, a series/parallel switching circuit 702 for the power generation devices (solar panels), one or more installed power generation devices 703 a series/parallel switching circuit 704 for the installed batteries, one or more installed batteries 705, one or more lamps 706, and one or more USB ports 707. The controller 701 may include a microprocessor as discussed above having firmware programming that includes solar panel switching logic, in addition to battery identification logic, battery charging logic, and battery discharging, as discussed herein. The controller system 701 may additionally have a similar collection of devices therein for routing power to the microprocessor, the USB charging circuit, and the lamp circuit.

Figure 8:
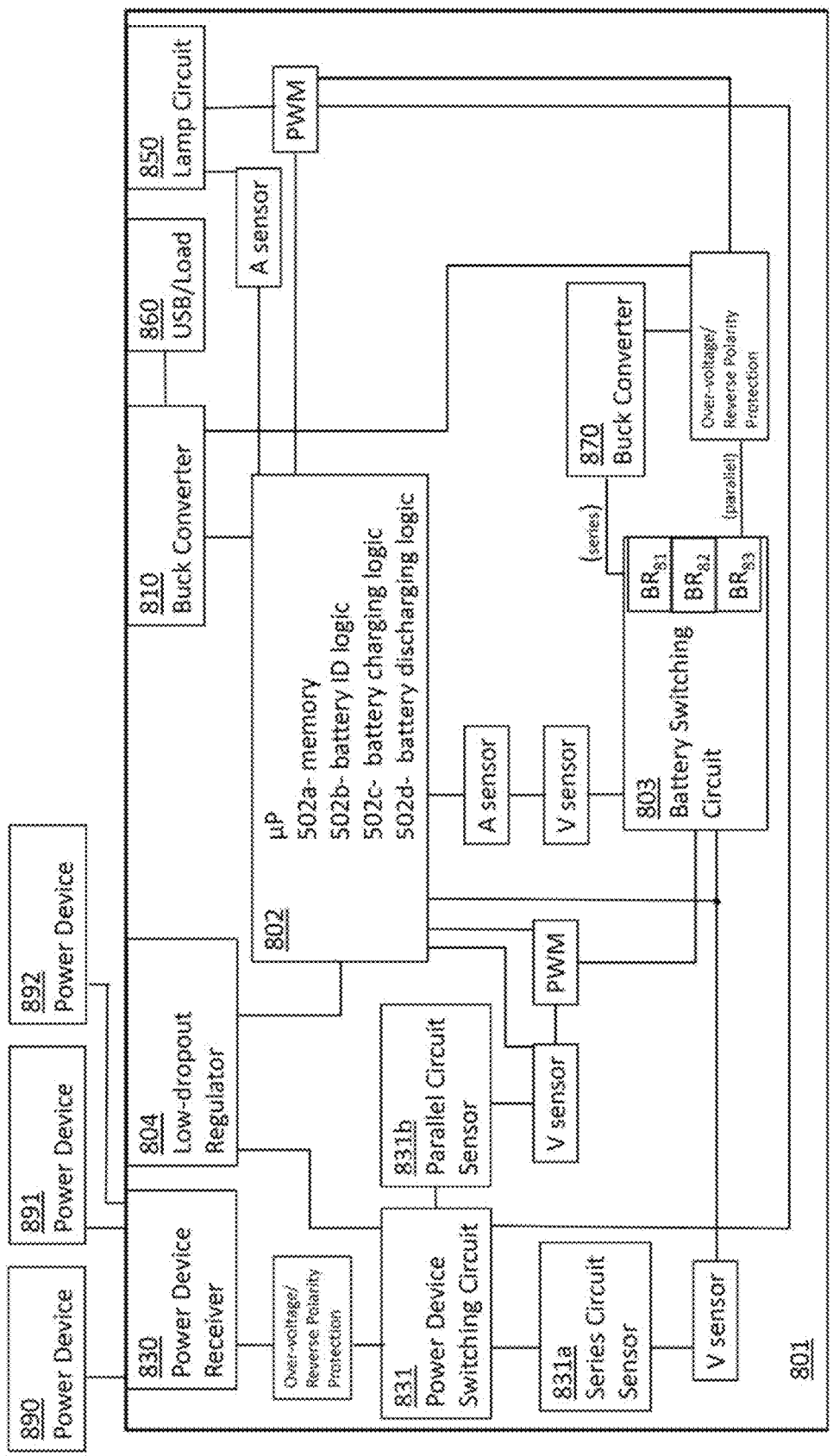
FIG. 8 is a generalized system layout of electronic components of a lighting/recharging system according to another embodiment of the present invention.

FIG. 8 provides a diagram overview of the electronic system of a lighting/charging system 800 according to an embodiment of the present invention. The system 800 includes a controller unit 801 in which a microprocessor 802 and most of the operative electronics of the system may be housed, a power generation device receiver 830 in electronic communication with the one or more power devices (890, 891, and 892), a power device switching circuit 831, a USB charging system 860 that may include one or more USB inputs for powering external electronic devices (e.g., a mobile phone), a lamp circuit 850 for receiving and powering one or more lamps (e.g., LED lamps), and a battery switching circuit 803. The controller 801 includes a microprocessor 802 that may be manufactured with firmware logic that receives inputs (voltage and current signals) from a number of points in the electronics of the system. The microprocessor 802 may include firmware logic that receives signals from the battery switching circuit 803 providing voltage readings from one or more batteries installed in battery receivers (BR$_{81}$, BR$_{82}$, and BR$_{83}$) in the battery switching circuit 803. The microprocessor may take multiple voltage readings from the battery receivers with the batteries in various configurations (e.g., parallel, series, and open circuit configuration in which current is able to flow through body diodes only, etc.) to determine the chemistry of the batteries installed in the battery receivers, as previously discussed herein. The microprocessor 802 may also include firmware logic that receives signals the power generation device switching circuit 831, providing voltage and current readings to determine the amount of power available from the attached power generation devices at a given time. The microprocessor 802 may be electronically connected to the transistors within the power device switching circuit and the battery switching circuit, allowing the microprocessor 802 to switch the condition of the transistors (e.g, MOSFETs) within the power device and battery switching circuits to thereby switch the configuration of the installed power generation units and the installed batteries between parallel and series. The microprocessor 802 may also be in electronic communication with series circuit sensor 831a and parallel circuit sensor 831b, which provide current and/or voltage data from the power generating devices when they are in series and parallel configurations, respectively. The microprocessor includes battery identification logic firmware 802b, battery charging logic firmware 802c, battery discharging logic firmware 802d, and solar panel switching logic 802e that enables the microprocessor to:

a. switch the configurations of the batteries between series and parallel in response to changes in the voltage and current provided by the power generation devices;
b. switch the configuration of the batteries between series and parallel in response to changes in the power demands of the lamp circuit and the USB charging circuit;
c. determine the type of battery installed in the system based on the voltage readings taken within the battery circuit when the one or more batteries are in different configurations;
d. determine the voltage and current available from the attached power generation devices; and
e. switch the configuration of the power generation devices between series and parallel based on the power demands of the system, including battery charging, the lamp circuit, and the USB charging circuit and based on instantaneous voltage and current output of the power generations devices.

Once the microprocessor identifies and classifies the type of batteries that are installed in the battery receivers, the microprocessor stores the battery identification in a memory 802a. The battery charging logic 802c may interpret voltage readings from the installed batteries in view of the classification of the batteries to determine when a charging operation to recharge the installed batteries should be performed. The battery charging logic 802c may then apply a charging algorithm to the installed batteries that is selected based on the classification of the installed batteries stored in the memory 802a. The voltage of and the supplied current to the installed batteries is monitored during the charging operation, and once the voltage readings from the battery reach a termination threshold set in the battery charging logic 802c, the batteries will have reached full charge, and the charging operation is terminated.

During charging operation, the microprocessor may apply current to the batteries through pulse width modulation (PWM) in order to control the average current applied to the batteries during the charging operation (e.g., when the power generating devices are in parallel configuration). As shown in FIG. 8, PWM may be utilized to regulate current being supplied to the batteries depending on the series or parallel configuration of the external power device(s) (e.g., solar panels) and the phase of the battery charging operation (e.g. absorption). In some embodiments, and without limitation, a voltage step-down (buck) converter may be utilized to step down voltage supplied by the power generation devices, as in the system shown in FIG. 5. In other embodiments, the system 800 may be designed to receive multiple 12 V batteries and 12 V solar panels as the power generation source. In such embodiments, a buck converter is not necessary to step down voltage between the solar panels and batteries. A buck converter 810 may be used to step down voltage between the batteries and the USB charging circuit 860, and in some embodiments the between the batteries and the lamp circuit. In other embodiments (e.g., in embodiments that utilize higher voltage 12V batteries), an additional higher voltage buck converter 870 (e.g., 12 V step-down) may be used to step down voltage between the batteries and the lamp circuit 850 and between the batteries and a lower voltage buck converter 810 (e.g., 5 V step-down).

The current supplied to the batteries during a charging operation is variable depending on (1) the classification of the installed batteries and (2) the phase (bulk, absorption, or float) of the charging operation. Additionally, the direct source of the current (the power device or buck converter) may change depending on the charging phase, the amount of current provided by the power device(s). In embodiments in which 12 V solar panels and 12V batteries are utilized, the solar panels and batteries may be matched in their configurations (series or parallel). When power supplied by the solar panels is sufficiently high to charge the batteries (e.g., at or near maximum power point during bulk phase charging) the solar panels and the batteries may be in parallel configuration. In the case that the solar panels cannot supply sufficient voltage to sustain the voltage and current requirements of the charging algorithm applied to the batteries, the microprocessor may (1) direct the power generation device switching circuit 830 to the series configuration, and (2) direct the battery switching circuit 840 to the series configuration. During bulk phase, the power supplied by the solar panels can be supplied to the batteries without the need for modulation. Once the absorption phase of the charging algorithm begins, the microprocessor applies pulse width modulation to modulate the current (e.g., reduce the current level) according to the charge algorithm applied by the battery charging logic.

In order to control switching of the switching circuits 831 and 803, the microprocessor 802 may be in electronic communication with one or more transistors (e.g., MOSFETs, BJT, etc.) in the switching circuits 831 and 803. The power switching circuit 831 may include transistors and other electronic devices (e.g., Schottky diodes, etc.) to (1) prevent current inrush, overvoltage, and other possible damaging conditions from reaching the batteries of other sensitive components of the system, (2) provide current and voltage signals to the microprocessor, and (3) allow the microprocessor to control the routing of current to different points within the controller 801 based on (1) the amount of power supplied by the external power device(s), (2) whether the batteries are in a charging operation, and (3) the other power demands of the circuit (e.g., lighting and/or USB device charging). The power switching circuit 831 may route power from the power device(s) to the battery switching circuit 803 as directed by the microprocessor 802. In some embodiments (e.g., those that include higher voltage panels and batteries, such 12 V panels and 12 V batteries), the power switching circuit 831 and the battery switching circuit 803 may include over-voltage and reverse polarity protection circuits for both the connection to the power generation device switching circuit and the battery switching circuit. These protection circuits are to prevent damage to the sensitive components of the system (e.g., the microprocessor and other electronics) that may result from surges in voltage and installation error resulting in reverse polarity of the batteries or power generation devices. The components and design of such protection circuits are familiar to those skilled in the art.

The controller 801 may include one or more current monitoring devices for monitoring current provided by the power devices in both the series and parallel configurations. For example, the controller 801 may include a current monitoring device 831a that connects to the output of the current generation device switching circuit 831 when the power generation devices are in series configuration, and a second current monitoring device 831b that connects to the output of the current generation device switching circuit 830 when the power generation devices are in parallel configuration. The current monitoring devices may send signals to the microprocessor regarding the current level supplied by the power devices. For example, the current monitoring device may send a signal to the microprocessor when the power devices are in the parallel configuration drop below a threshold required to charge installed batteries (e.g., during a bulk phase). The power device switching logic firmware may then direct the power device switching circuit to switch the power devices to the series configuration.

The controller 801 may include a low-dropout regulator 804 that is connected to both the battery switching circuit 840 and the power switching circuit 831 and provides power to the microprocessor at a predetermined value (e.g., 2.5 V) when power is supplied to the controller 801 by either the external power device(s) or installed batteries. In other embodiments, the power switching circuit may be in electronic communication with the buck converter, and the buck converter may provide power to the microprocessor (e.g., 5 V).

The buck converter 810 supplies power to the USB system and the lamp circuit 850 at a stepped-down, predetermined voltage (e.g., 5V). The USB system includes a current limiting power switch that supplies current and voltage to one or more USB plugs in the USB system at the predetermined USB standard voltage and current. The current to the lamp circuit is regulated by the microprocessor 802 through PWM, as shown in FIG. 5. Power may also be supplied to the lamp circuit 850 from the power device switching circuit 831 when the power generating devices are in the series configuration. The lamp circuit 850 must be maintained below a maximum current to prevent damage to the light emitters (e.g., LEDs) electrically connected to the lamp circuit. In some embodiments, and without limitation, the buck converter may also supply power to the microprocessor. In such in embodiments, the low-dropout regulator may be omitted.

The battery switching circuit 803 may have a design that allows the configuration of the batteries to switched between series, parallel, and other configuration in order to allow the system (1) to run voltage tests in various configurations to determine the type of battery(ies) installed in the system, (2) to allow the system to perform various charging algorithms on the installed batteries (e.g., balance charging, charging multiple batteries of the same type at once), (3) to adapt to the power available from the power devices during a charging operation (e.g., switching to a series configuration when lower power is provided by solar panels due to light conditions), and (4) to adapt to power demands on the system (e.g., lighting and/or USB charging demands).

Figure 9:
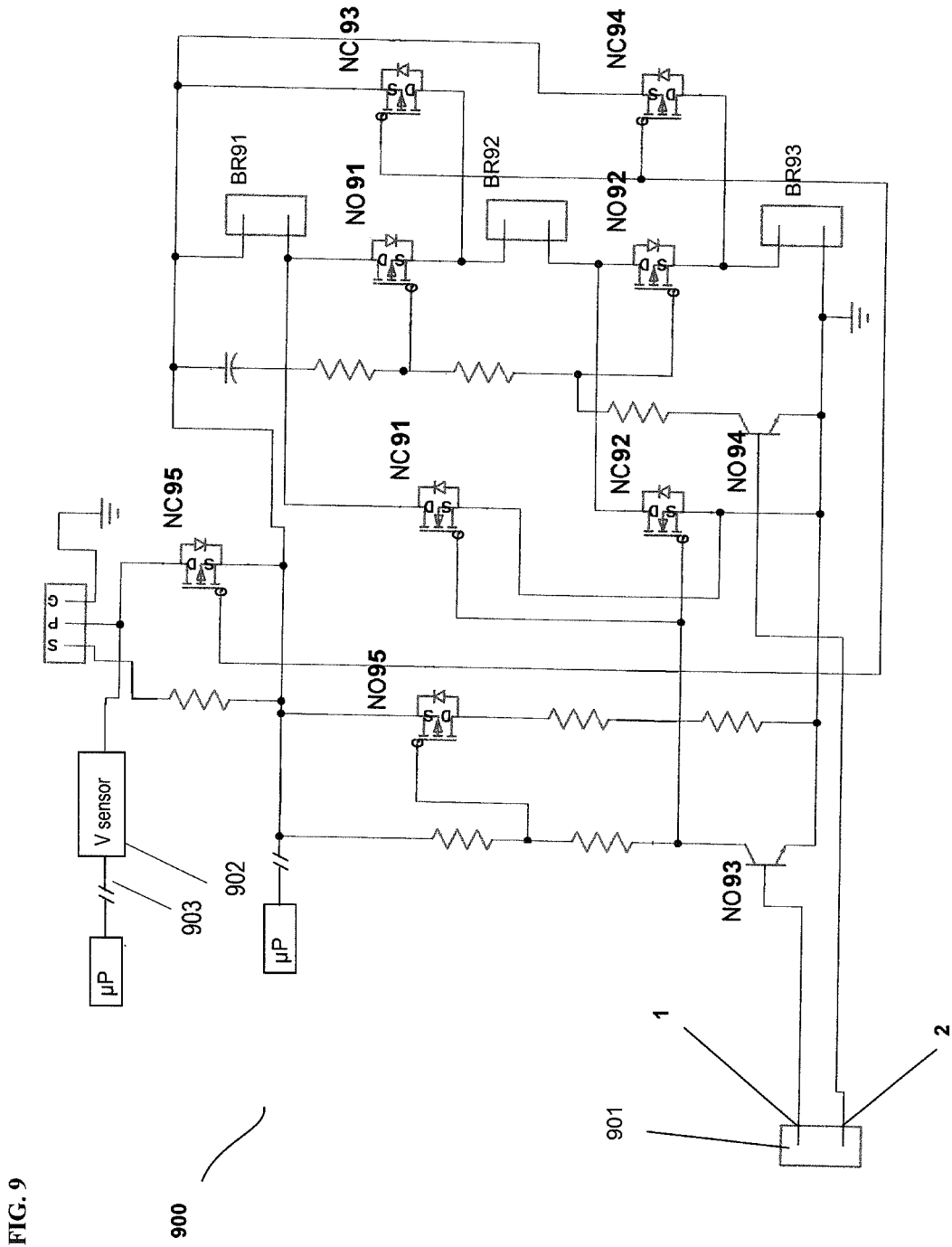
FIG. 9 is a generalized layout of the electronic components of a battery switching circuit according to another embodiment of the present invention.

FIG. 9 shows an example battery switching circuit 900 that may be utilized in a charging/lighting system like that shown in FIG. 8. The battery switching circuit 900 provides a generalized example battery circuit 900 according to an embodiment of the present invention. The battery circuit 900 includes three batteries $B_{91}$, $B_{92}$, and $B_{93}$ that are in electronic communication with six transistors (e.g., MOSFETs) that are operable to switch the battery configuration between series, parallel, and other configurations at the direction of the microprocessor μP. It is to be understood that the battery circuit is generalized and that it may include various other devices and that there may be additional devices and circuitry between the transistors and the microprocessor. The transistors include five normally open transistors $NO_{91}$, $NO_{92}$, $NO_{93}$, $NO_{94}$, and $NO_{95}$ that do not conduct under default conditions, and five normally closed transistors $NC_{91}$, $NC_{92}$, $NC_{93}$, $NC_{94}$, and $NC_{95}$ that are closed and conduct under default conditions, placing the batteries in parallel configuration under default conditions. The normally closed transistors may be switched to an open condition by the microprocessor by a first signal provided through output 1 of battery controller 901. The normally open transistors may then be switched to a closed condition by the microprocessor by a second signal provided through output 2 of battery controller 901 after the normally closed transistors are switched to open by the first signal. The result of the first and second of signals is that the battery circuit is placed in the series configuration.

The battery switching circuit may also include sensors therein in electronic communication with the microprocessor that enable the microprocessor to measure voltages and/or currents within the battery circuit when the battery circuit is in various configurations. For example, the battery circuit 900 may include voltage sensor 902 at the output connection 903 of the battery circuit, which transmits voltage data to the microprocessor. The battery circuit 900 may include additional sensors at additional positions to measure voltage and/or current. Battery identification logic of the microprocessor may analyze the data provided by the one or more voltage sensors (and/or other sensors in the battery circuit) when the batteries are in series, parallel, and other configurations in order to determine (1) how many batteries are installed in the battery circuit, (2) whether the batteries are of the same type or mixed chemistry, and/or (3) the particular type of battery(ies) that have been installed.

Figure 10:
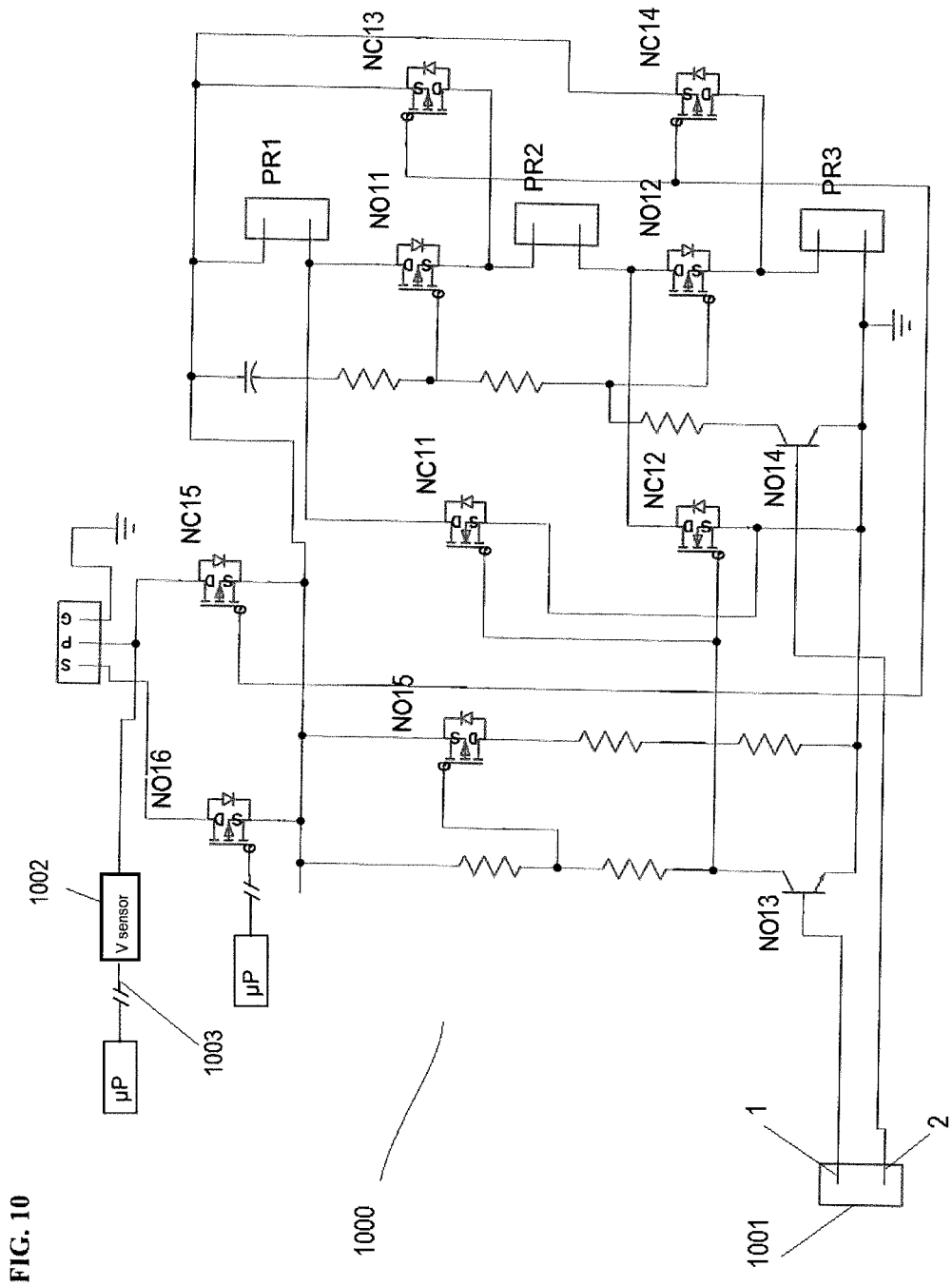
FIG. 10 is a generalized layout of the electronic components of a power device switching circuit according to an embodiment of the present invention.

The solar panel switching circuit may be designed similarly to the battery circuit shown in FIG. 9, with some differences. FIG. 10 shows an example power device switching circuit 1000 that may be utilized in a charging/lighting system like that shown in FIG. 8. The power device switching circuit 1000 provides a generalized example power device (e.g., solar panel) switching circuit according to an embodiment of the present invention. The power device circuit 1000 includes three power device (solar panel) receivers $R_1$, $R_2$, and $R_3$ that are in electronic communication with transistors (e.g., MOSFETs) that are operable to switch the power device configuration between series and parallel configurations at the direction of the microprocessor. It is to be understood that the power device circuit 1000 is generalized and that it may include various other devices and that there may be additional devices and circuitry between the transistors and the microprocessor. The transistors include six normally open transistors $NO_{11}$, $NO_{12}$, $NO_{13}$, $NO_{14}$, $NO_{15}$, and $NO_{16}$ that do not conduct under default conditions, and five normally closed transistors $NC_{11}$, $NC_{12}$, $NC_{13}$, $NC_{14}$, and NC's that are closed and conduct under default conditions, placing the power devices in parallel configuration under default conditions. The normally closed transistors may be switched to an open condition by the microprocessor by a first signal provided through output 1 of power device controller 1001. The normally open transistors may then be switched to a closed condition by the microprocessor by a second signal provided through output 2 of power device controller 1001 after the normally closed transistors are switched to open by the first signal. The result of the first and second of signals is that the power devices are placed in the series configuration.

The power device switching circuit may also include sensors therein in electronic communication with the microprocessor that enable the microprocessor to measure voltages and/or currents within the power device circuit when the power circuit is in various configurations. For example, the power device circuit 1000 may include voltage sensor 1002 at the output connection 1003 of the power circuit, which transmits voltage data to the microprocessor. The power device circuit 1000 may include additional sensors at additional positions to measure voltage and/or current. The power device switching logic of the microprocessor may be operable to analyze the voltage and current data supplied by the sensors in the power device circuit to switch the configuration of the power devices between series and parallel. For example, when the voltage and/or current provided by the power devices in parallel configuration drops below a pre-determined for operating the concurrent power demand on the system, the power device switching logic direct the power device switching circuit to reconfigure the power devices from parallel to series configuration.

The diagrams provided in FIGS. 3-10 and the accompanying discussion present generalized overviews of embodiments of the present invention. A specific example of a lighting and charging system according to an embodiment of the present invention is provided below. It is to be understood that the specific example is not the only embodiment of the invention, and that one of ordinary skill in the art would be enabled by the disclosure provided herein to practice other embodiments of the system.

Figure 11:
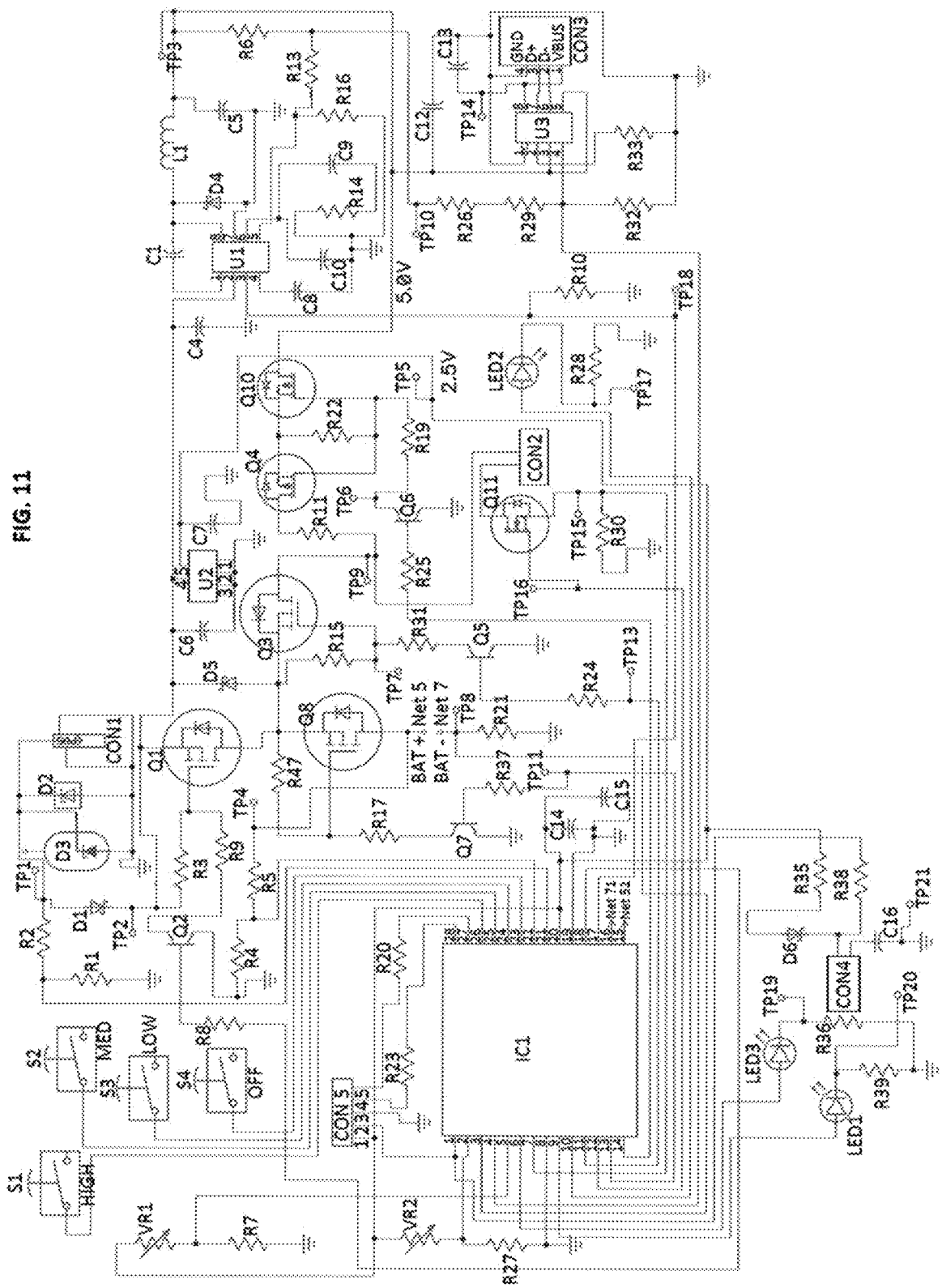
FIG. 11 is a view of a first portion of an exemplary control circuit of an embodiment of the present invention
Figure 12:
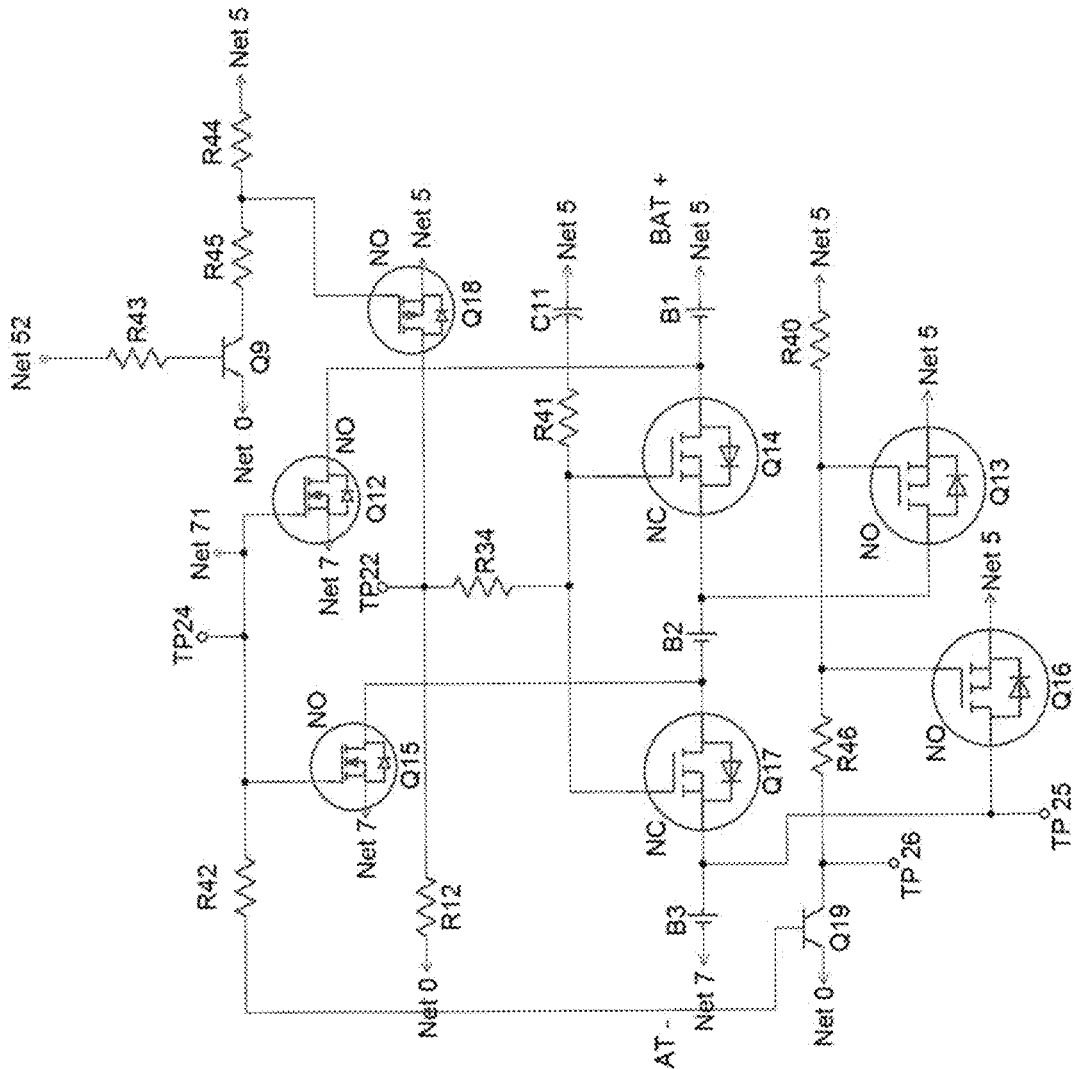
FIG. 12 is a view of a second portion of an exemplary control circuit of an embodiment of the present invention.

FIGS. 11-12 and the accompanying description provide a detailed example of an exemplary system, including the specific components and electronics thereof. It is to be understood that the electronics described below may be included in systems of other embodiments (e.g., as shown in FIGS. 3-10), and provide the functionalities described above.

As shown in the schematics in FIGS. 11-12, an exemplary controller may include a microcontroller IC1 may have multiple analog inputs to monitor voltages throughout the circuit, digital outputs to set specific circuit configurations based on the monitored voltages of an attached solar panel and batteries, outputs capable of pulse width modulation to control battery charging and LED light operation, capacitive touch sensing inputs for control of the LED light output, and firmware that utilizes machine state firmware theory. The pin functions are as follows:

Pin 1—programming the microcontroller
Pin 2—measuring the voltage across the temperature sensing thermistor VR2 through a voltage divider
Pin 3—measuring the voltage across R21 to determine the battery charge current
Pin 4—measuring the voltage of Pin 4 on U3 to determine if current is being drawn by the USB charge port
Pin 5—measuring the voltage across the temperature sensing thermistor VR1 through a voltage divider
Pin 6—output to illuminate status LED 3 (green)
Pin 7—measuring the voltage across R30 to determine the LED lamp current
Pin 8—ground connection
Pin 9—output to illuminate status LED 1 (red)
Pin 10—output to illuminate status LED 2 (yellow)
Pin 11—output to NPN switching transistor Q5 to close P-Channel MOSFET Q3
Pin 12—PWM output to N-Channel MOSFET Q11 to control the average current to the LED lamp
Pin 13—PWM output to NPN switching transistor Q7 to close and open P-Channel MOSFET Q8 to control the average current to the batteries for charging
Pin 14—output to NPN switching transistor Q6 to close P-Channel MOSFETs Q4 and Q10 as a bi-directional switch
Pin 15—output to NPN switching transistor Q9 to close P-Channel MOSFET Q18 to open P-Channel MOSFETs Q14 and Q17 to switch the battery configuration from series to partial parallel and vice versa
Pin 16—output to close N-Channel MOSFETs Q12 and Q15 and to NPN switching transistor Q19 to close P-Channel MOSFETS Q13 and Q16 to switch the battery configuration from partial parallel to fully parallel and vice versa
Pin 17—output to turn on the DC-DC non-synchronous step-down (buck) converter U1
Pin 18—output to NPN switching transistor Q2 to close P-Channel MOSFET Q1
Pin 19—ground connection
Pin 20—power connection
Pin 21—measuring voltage of solar input (via voltage divider to not overstress port)
Pin 22—measuring of voltage of batteries at positive terminal of battery holder B1 (via voltage divider to not overstress port)
Pin 23—capacitive switch 1 sensing (off)
Pin 24—capacitive switch 2 sensing (low)
Pin 25—capacitive switch 3 sensing (medium)
Pin 26—capacitive switch 4 sensing (high)
Pin 27—programming the microcontroller
Pin 28—programming the microcontroller The system circuitry may include a stepdown (buck) converter U1 (e.g., a DC-DC non-synchronous step-down converter) and related circuitry that may provide a power conversion function, converting relatively high voltage and relatively low current into 5V with relatively high current for stepping down the voltage for use in the one or more charging ports (e.g., USB port) of the system. The step-down converter may provide the power required for the charging port and the charging of one or more installed batteries (under certain conditions), and for running the one or more lamps (e.g., LED lamps) for the lighting purposes (under certain conditions), all while isolating the solar panel from the circuit load. The isolation of the solar panel from the load may allow the solar panel to operate near its maximum power point, rather than the solar panel being forced to operate at the voltage of the circuitry load as dictated by Kirchhoff's Voltage Law. For example, with the step-down converter U1 in place, the system may allow the attached solar panel capable of operating at a MPP of 17V and 0.59 A to maintain the MPP (assuming solar conditions are adequate to support the MPP) and deliver power at 5V with a current capability of approximately 2.0 A to a charging port.

The step-down converter may draw power from either power generation source such as a solar panel, or from the installed batteries to provide optimum performance for the consumer. When step-down converter U1 draws power from the batteries, transistor Q1 (e.g., a MOSFET transistor) remains open so that if a solar panel is plugged into the system, the current will not immediately rush through the batteries or the lamp. Although transistor Q1 may include a reverse body diode that allows power to conduct from the installed batteries to step-down converter U1, the voltage drop through transistor Q1 creates too much loss; therefore, the voltage from the three batteries may be supplied to the step-down converter U1 through a low VF Schottkey diode D5. The step-down converter U1 may be turned on and off by the microcontroller IC1, based on different operating voltages in the circuit that the microcontroller IC1 may monitor (e.g., the voltage provided by the one or more solar panels, and the voltage provided by the one or more installed batteries).

The system may also include a voltage regulator U2 (e.g., a low-dropout voltage regulator) and related circuitry that may provide a controlled power level (e.g., 2.5V) to the microcontroller IC1. Powering the microcontroller at 2.5V may allow the microcontroller IC1 to draw power from multiple sources ranging from one or more fully charged or depleted batteries, and/or sources that provide higher voltages, such as solar panels. When voltage regulator U2 draws power from the installed batteries, transistor Q1 remains open such that if one or more solar panels are plugged into the controller, the current will not immediately rush through the installed batteries or the one or more lamps. The voltage from the installed batteries may be supplied to the voltage regulator U2 while the transistor Q1 is open through the Schottkey diode D5. The voltage regulator U2 may also provide a reference voltage (e.g., set at 2.5V) for the microcontroller IC1 to use in its analog measurement of specific voltage levels in the circuit with a higher resolution compared to higher input voltages (e.g., 5V).

The system may include multiple status lights or other indicators and related circuitry to provide cues to the user about the status of the system. As shown in FIG. 11, the system may include LED 1, LED 2, and LED3, which may each have a different color (e.g., red, yellow, and green, respectively) and may provide feedback to the user regarding battery charge levels (green), status of input power for an external power source such as a solar power (yellow), and to let the user know if a fault has occurred with the external power source or with the installed batteries (red).

The system may include a USB dedicated charging port controller and current limiting power switch U3 and related circuitry, which may provide auto-detection of USB data line voltages and automatically provide the correct electrical signature on the data lines to charge compliant devices among multiple dedicated charging schemes. The USB dedicated charging port controller and current limiting power switch U3 may also provide a current limiting function so as to charge the USB compliant device from a power input of an external source such as a solar panel or from the internally installed batteries. The microcontroller IC1 may monitor the draw of current by an attached external electronic device through the charging port. The system may configure the batteries (e.g., LFP or Li-Ion batteries) in series to produce a higher voltage when the system is charging an external electronic device (and, optionally, simultaneously powering the LED light(s)), and switch the configuration of the batteries to parallel once the microcontroller IC1 senses that the external electronic device is no longer drawing current (the parallel configuration is more appropriate for powering the LED light(s) alone). In some embodiments, and without limitation, the microcontroller IC1 may control the current limiting function of the charging port controller and current limiting power switch U3 such that a limited amount of current is drawn by an external device attached to the USB charging port when power is needed for other functions; e.g., the operation of the one or more lamps and charging the installed batteries.

The system may also include a battery compartment or holder for housing and electrically connecting the installed batteries to the system. FIG. 12 provides a schematic of an exemplary circuitry associated with the battery compartment for housing and electrically connected installed batteries. The compartment may include three independent holders for batteries B1, B2, and B3, or may be one holder but with each battery terminal being independent of all other terminals, thus not forcing the batteries into either serial or parallel configurations.

The controller may include transistors in electronic communication with the battery compartment and installed batteries that can be used to change the configuration of the installed batteries (e.g., from series to parallel and vice versa) depending on a number of factors. Those factors include the power available from attached one or more solar panels (which varies depending on weather and environmental conditions: clouds, low-light conditions, etc.), the power available from the installed batteries, and the current load on the system (e.g., the one or more lamps and/or an external electronic device). For accurate measurement of the battery voltage, the measurement the microcontroller IC1 may measure the voltage of the batteries when the batteries are neither providing power nor being charged (no load or charge). To do so, the battery measurement may be timed with the pulse width modulation (PWM) timing of the power supply to one or more LED lamps and/or any external electronic devices being powered or charged by the system so that measurement is made during the time when no current is being supplied to LED lamp(s) or the external electronic device(s). Similarly, the battery voltage measurement is always timed with the PWM timing of the battery charge so that the measurement is made during the time when no current is being supplied to the batteries.

The microcontroller IC1 may change the configuration of the installed batteries to place them in series or in parallel without the batteries being physically moved by changing the state (open or closed) of one or more transistors (e.g., MOSFETs) located in the control circuitry associated with the battery compartment. For example, and without limitation, the system includes transistors Q14 and Q17 (e.g., P-Channel MOSFETs) that may be closed (with transistors Q12, Q 13, Q 15, and Q16 being in the open condition) to place the batteries installed in holders B1, B2, and B3 in a series configuration. The drain of transistor Q14 may be connected to the negative terminal of battery holder B1, and the source of transistor Q14 may be connected to the positive terminal of battery holder B2. In addition, the drain of transistor Q17 may be connected to the negative terminal of battery holder B2 and the source of transistor Q17 may be connected to the positive terminal of battery holder B3. The gates of Q14 and Q17 may be connected to ground through resistors R34 and R12 such that as the batteries are being installed in battery holders B1, B2, and B3, the gate to source voltage may be maximized to cause the two transistors Q14 and Q17 to be closed. When the batteries are installed in holders B1, B2, and B3, transistors Q14 and Q17 are in the normally closed switch configuration because of the gate connection to ground and the three batteries are connected in series with no output from the microcontroller.

Transistors Q13 and Q16 (e.g., P-Channel MOSFETs) in the circuitry associated with the battery compartment may have their respective drains connected to the negative terminals of battery holders B1 and B2, (via transistors Q14 and Q17 when they are closed) their sources may be both connected to the positive terminal of battery holder B1, and their gates may be connected to the positive terminal of battery holder B1 (when no current is passing through transistor Q19). In this arrangement, the gate to source voltage of both transistors Q13 and Q16 is near zero and both transistors Q13 and Q16 are normally open such that with no output from the microcontroller there is no shorting of the negative terminals of battery holders B1 and B2 to the positive terminal of battery holder B1.

Transistors Q12 and Q15 (e.g., N-Channel MOSFETs) in the circuitry associated with the battery compartment may have their respective drains connected to the positive terminals of battery holders B2 and B3 (via Q14 and Q17 when they are closed) and may have their sources both connected to the negative terminal of battery holder B3. Both transistors Q12 and Q15 may have their gates connected to ground via Pin 16 of the microcontroller IC1 so the voltage between the gate and source of each of the transistors Q12 and Q15 is near zero and both transistors Q12 and Q15 are normally open so that with no output from the microcontroller IC1 there may be no shorting of positive terminal of battery holder B2 and B3 to the negative terminal of B3.

Each of the transistors associated with the battery compartment (Q12, Q13, Q14, Q15, Q16 and Q17) may include an internal body diode that is oriented in a manner to allow a limited flow of current through the transistor when the transistor is open. For example, with no external power being supplied to the circuitry associated with the battery compartment, there is a positive voltage at the positive terminal of B1 when a battery is installed in the holder B1, and a circuit is completed through the source of transistor Q12 via the associated body diode. In such a scenario, even though there are no batteries installed in holders B2 and B3, a circuit is completed and power is supplied to the voltage regulator U2. If the voltage of the installed battery is high enough, the microcontroller IC1 will turn on. The body diode of transistor Q12 reduces the voltage provided by the battery (e.g., by about 0.5V), and the voltage measurement of the battery will consequently be approximately 0.5V below the actual value. The voltage drop-off may be useful for checking for mixed chemistry battery combinations, as discussed below. Similarly, if a battery is installed in battery holder B2 (without batteries being installed in holders B1 and B3) the source of transistor Q13 may be connected to the positive terminal of holder B1 and the source of transistor Q15 may be connected negative terminal of holder B3, such that a circuit is completed through the body diodes of transistors Q13 and Q15 and power is again supplied to the voltage regulator U2. Also, if the battery voltage is high enough, the microcontroller IC1 will turn on. Similarly, if a battery is installed in battery holder B3 (without batteries being installed in holders B1 and B2), the source of transistor Q16 being connected to the positive terminal of holder B1, a circuit is completed through the body diode of transistor Q16 and once again power is supplied to the voltage regulator U2. As a result, the consumer of this product is not forced to install the battery in a particular order, making the product more user-friendly. Because transistors Q14 and Q17 are to be normally closed when batteries are installed as controlled by a voltage difference between the gate and source of each device, and because batteries being installed can be as low as 0.7V in their depleted state, the gate to source threshold voltage of the devices must be sufficiently low to active the device at 0.7V and still be able to handle the voltage difference between the source and drain and the requisite currents of the product.

For parallel configuration, the order of how the transistors are switched is important so as not to connect the negative terminals of the battery holders directly to the positive terminals of the battery holders, which would cause short circuits. When the batteries are to be place in parallel configuration, first the transistors Q14 and Q17 (e.g., P-Channel MOSFETs) need to be switched open. The microcontroller IC1 may provide a voltage (and therefore current) from pin 15 (RC4) to the base of the transistor Q9 (e.g., an NPN switching transistor) which allows current to pass through the transistor Q9 and thus bring the potential of its collector to nearly equal the potential of its emitter, which is connected to ground. This may in turn drop the potential of the gate of transistor Q18 (e.g., a P-Channel MOSFET) so that there is large enough voltage between the gate and source of transistor Q18 to make the switch close, thus raising the potential of the gates of transistors Q14 and Q17. Once the potential of the gates of transistors Q14 and Q17 is raised, the voltage between the gates and sources of these two devices is reduced so that the switches are open and the batteries installed in holders B1, B2, and B3 may be disconnected from one another.

The gate of transistor Q18 may be connected to the collector of transistor Q9 through a voltage divider so that the gate to source voltage limit of the device is not violated. Because of the specific orientation of transistors Q12, Q13, Q15 and Q16, a circuit may be complete through the body diodes of the those devices so that the batteries are still providing power to voltage regulator U2 and thus power to the microcontroller IC1 so that the system is still operational. Because of the fast switching of the transistors Q14 and Q17 (e.g., P-Channel MOSFETs), the voltage change in the circuit can be almost instantaneous and an RC circuit made up of capacitor C11 and resistors R41 and R34 (and sometimes resistor R12), which described below in further detail, may operate to slow the change in voltage levels in the circuitry associated with the battery compartment. Consequently, the microcontroller IC1 may pause the switching process (e.g., momentarily make no further changes to the conditions of the transistors) for several milliseconds (e.g., about 8 ms to about 150 ms, or any value therein) to allow the voltages in the circuit to stabilize before initiating further switching in the transistor in the circuitry associated with the battery compartment.

After the requisite pause, another output from the microcontroller IC1 from pin 16 (RC5) may be activated that simultaneously supplies voltage to transistor Q15 and Q12 (e.g., N-Channel MOSFETs) to close them and connect the negative terminals of battery holders B1 and B2 to the negative terminal of B3. The output from the microcontroller IC1 may also supply a voltage (and therefore current) to the base of transistor Q19 (e.g., NPN switching transistor), which may allow current to pass through the transistor Q19 to bring the potential of the collector thereof to nearly equal the potential of the emitter thereof, which is connected to ground. This in turn may drop the potential of the gate of transistors Q13 and Q16 (e.g., P-Channel MOSFETs) so that there may be a large enough voltage between the gate and source of the two transistors Q13 and Q16 to close them thereby connect the positive terminals of battery holders B2 and B3 to the positive terminal of battery holder B1 and place the batteries in parallel to one another. The gates of transistors Q13 and Q16 may be connected to the collector of transistor Q19 through a voltage divider so that the gate to source voltage limit of these devices is not violated. Because the microcontroller IC1 may be powered at 2.5V (setting its output levels at 2.5V), the transistors Q12 and Q15 (e.g., N-Channel MOSFETs) must have a low enough gate to source threshold voltage to allow the devices to fully turn on with a gate potential of 2.5V, while being able to meet all the other circuit voltage and current requirements. Batteries that are depleted to a voltage output as low as 0.7V may be installed in the circuit, and the gate to source threshold voltage of the transistors Q13 and Q16 may be sufficiently low to activate the device at 0.7V and yet be able to handle the voltage difference between the source and drain and the requisite currents of the product.

The system may also be capable of switching the installed batteries from a parallel configuration to a series configuration. The above described process for switching the battery configuration from series to parallel may be performed in opposite order (in reverse) to place the batteries in series configuration. The microcontroller IC1 may cease the voltage output to transistors Q12, Q15 and Q19 to turn them off, and, after the requisite time delay (e.g., about 8 ms to about 180 ms, or any value therein), the output from the microcontroller IC1 to transistor Q9 may be turned off, restoring the circuit to a series configuration.

Several of the transistors in the present system may be MOSFETs, which have very fast switch times. Thus, as batteries are being installed, or as the batteries are being switched between series and parallel and back again, there may be instantaneous changes in voltage due to the switching or connection of the battery terminals to the battery holder terminals, which may cause an instantaneous surge of current through transistors Q14 and/or Q17, depending on which battery holder is receiving a battery. To compensate for the potential current surges, capacitor C11 and resistors R41 and R34, (and sometimes resistor R12) may be used to create an RC circuit that slows the change in voltage between the gate and source of transistors Q14 and Q17 to regulate the current going through the body of the transistors (e.g., MOSFET) and prevent damage to the transistors. When the circuit is in series configuration, resistor R12 may be connected to ground and included in the RC circuit. When the batteries are in parallel configuration, transistor Q18 is closed and pin 1 of resistor R12 may be at the same potential as the positive terminal of battery holder B1. Resistor R12 may be sized to limit the amount of leakage current going through it in this parallel condition of the batteries, and may no longer part of the RC circuit. The transition time from parallel to series may be less than the transition time from series to parallel, and the RC circuit is designed to assure current is properly limited for the series-to-parallel transitions and when individual batteries are installed.

The system of the present invention may be operable to charge the batteries installed in holders B1, B2, and B3 in either series or parallel configurations. The microcontroller IC1 may monitor the current going through the batteries. A very low value resistor R21 may be located between the negative terminal of the battery holder B3 and ground (when in series configuration) and between the negative terminal of battery holders B1 and B2 and B3 and ground (when in parallel configuration). The microcontroller IC1 may monitor the potential at the positive side of resistor R21 as current passes through it (after having gone through the batteries) and then translates that potential into a current reading. The microcontroller IC1 calculates both peak current and average current going through resistor R21. The average amount of current passing through the batteries is controlled via a pulse width modulation (PWM) process by the microcontroller IC1 providing specific time based pulses of voltage to the base of transistor Q7 (e.g., an NPN switching transistor), which allows current to pass through the transistor Q7 and bring the potential of the collector to nearly equal the potential of the emitter, which is connected to ground. This in turn drops the potential of the gate of transistor Q8 (e.g., a P-Channel MOSFET) such that there is large enough voltage between the gate and source of transistor Q8 to activate it and allow it to conduct and allow current to pass through the batteries. The gate of transistor Q8 is connected to the collector of transistor Q7 through a voltage divider so that the gate to source voltage limit of the transistor Q8 is not violated. The source of Q8 is connected to the input power of the solar panel through transistor Q1 (e.g., a P-Channel MOSFET), or is connected to the output of the step-down converter U1 through a combination of transistors Q3, Q4 and Q10 (e.g., MOSFETs).

Because the installed batteries should not be charged when over a certain temperature threshold, one or more thermistor temperature sensors, such as VR1 and VR2, may be placed at various locations, such as near the positive terminals of battery holders B1 and B3. If one or more thermistor temperature sensors (e.g., VR1 and VR2) measure a temperature above a predetermined threshold, battery charging will be inhibited until the unit cools.

Figure 13:
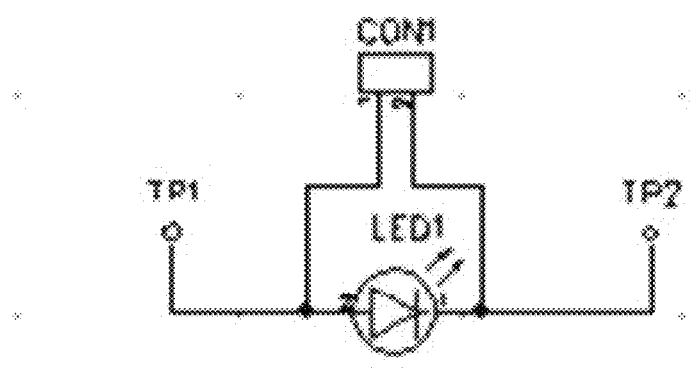
FIG. 13 is a view of an exemplary circuit connecting LED lamps to an exemplary control circuit of the present invention.

The system may provide power for one or more light sources (e.g., one or more LED lamps). The microcontroller IC1 may actively monitor the current going through the LED lamps. An exemplary LED lamp circuit is shown in FIG. 13. The exemplary lamp circuit includes a connector CON1 for electronically connecting to connector CON2 shown in FIG. 11. The LED lamp circuit may be placed within a housing designed for sitting on a flat surface and/or attachment to a wall or ceiling, for being anchored in the soil, trees, rock crevices, or other natural anchoring points, etc. The connectors CON1 and CON2 may be standard LED connectors. A low value resistor R30 (e.g., a resistor having a resistance of about 0.2 ohm) may be located between the negative terminal of connector CON2, which provides power to the LED lamps LED1 and LED2 through connector CON1 as shown in FIG. 13 and ground. The microcontroller IC1 may monitor the potential at the positive side of resistor R30 as current passes through it after having gone through LED1 and LED2. The microcontroller IC1 may then translate that potential into a current reading. The average amount of current passing through the LED1 and LED2 is controlled via a pulse width modulation (PWM) process by the microcontroller IC1. The microcontroller IC1 may provide specific time based pulses of voltage to the gate of transistor Q11 (e.g., a N-Channel MOSFET), which may raise the potential of the gate of the transistor Q11 such that there is a large enough voltage between the gate and source of transistor Q11 to allow transistor Q11 to conduct current and allow current to pass through LED1 and LED2. The positive terminal of connector CON2 is connected to the input power of the solar panel through transistors Q1 and Q3 (e.g., P-Channel MOSFETs), or is connected to the output of the step-down converter U1 through a combination of transistors Q4 and Q10 (e.g., P-Channel MOSFETs), as discussed further below. When the power for the LED 1 and LED 2 is provided by solar power through the step-down converter U1 and the installed batteries are fully charged, transistors Q3 and Q8 may be in the open state so that power cannot come from the installed batteries, preventing the batteries from being depleted during the lamp operation.

The light output of LED1 and LED2 lamp may be varied by the microcontroller IC1 using PWM process to control the average current going through LED1 and LED2. The microcontroller IC1 may utilize capacitive touch sensing pads S1, S2, S3, and S4 to control the current passed through LED1 and LED2. The LED lamp typically may be operated at a minimum of 2.8V to achieve full luminosity of the LED1 and LED2. Because LEDs are susceptible to over current due to their inherently low internal resistance, the LEDs also have a maximum voltage in which they can operate (e.g., 4.6V). When the LED lamp is powered through step-down converter U1, which provides 5V in order to supply the requisite voltage for the charge port (e.g., a USB port), the voltage needs be reduced so as not to provide too much current to the LED1 and LED2. A low value resistor R11 may be used to step down the voltage provided by step-down converter U1 to LED1 and LED2. When power is coming from the installed batteries in parallel configuration (with transistors Q4 and Q10 in the open condition and transistors Q8 and Q3 in the closed condition) the voltage provided by the batteries may not rise above about 4.2V, and thus a step-down resistor may not be necessary. When the installed batteries are in a series configuration and the total voltage provided by the batteries is less than about 5.25V (e.g., no load is applied and the installed batteries are of mixed chemistry or Alkaline batteries) step-down converter U1 may remain in an off condition, transistors Q4 and Q10 may be in an open condition, and transistors Q8 and Q3 may be in a closed condition, allowing the batteries to provide power to the LED lamp. Under such system conditions, power from the installed batteries may be supplied to LED1 and LED2 without overpowering the LEDs because the total voltage supplied by the installed batteries sag under load. If when the batteries are in series and the total voltage of the batteries is about 5.25V or more (e.g., no load applied and the installed batteries are of mixed chemistry), transistor Q3 may in an open condition, transistor Q8 may be in a closed condition, and power will go from the batteries through Schottky diode D5 to power step-down converter U1. In addition, transistors Q4 and Q10 may be closed so that energy from step-down converter U1 can be supplied to the lamp LEDs. In this configuration, transistor Q1 remains closed so that if a solar panel is plugged in, the voltage from the solar panel is not allowed to reach LED1 or LED 2, nor feed through transistors Q4 and Q10 and thus reach the charging port controller and current limiting power switch U3, which may have a maximum voltage input of about 6V.

The arrangement of transistors Q4 and Q10 (e.g., P-Channel MOSFETs) in the controller circuitry may create a bi-directional circuit switch due to their sources being connected to one another and having opposing body diodes such that when both switches are open, no current may be passed through the combination in either direction. The transistors Q4 and Q10 may be switched by output from the microcontroller IC1 providing voltage (and therefore current) to the base of the transistor Q6 (e.g., an NPN switching transistor), which allows current to pass through the transistor Q6 and thus bring the potential of the collector to nearly equal the potential of the emitter, which is connected to ground. This in turn drops the potential of the gate of the transistors Q4 and Q10 (e.g., a P-Channel MOSFETs) such that there is large enough voltage (due to voltage leakage through the reverse body diodes) between the gate and source of each of transistors Q4 and Q10 to close the bi-directional switch. The gates of transistors Q4 and Q10 are connected to the collector of transistor Q6 through a voltage divider so that the gate to source voltage limit of the transistors Q4 and Q10 is not violated. Similarly, transistor Q1 (e.g., a P-Channel MOSFET) is switched by voltage control from the microcontroller IC1 supplied to the base of transistor Q2 (e.g., an NPN switching transistor). The gate of transistor Q1 may be connected to the collector of transistor Q2 through a voltage divider so that the gate to source voltage limit of transistor Q1 is not violated.

The system includes at least one connector configured to electronically connect with a solar panel, such that the solar panel can provide power to the system. For example, and without limitation, the power generated by the solar panel may be provided to the circuit though connector CON1 shown in FIG. 11 with some overvoltage protection provided by overvoltage protector diode D3 and transient voltage suppressor D2. The system may include a low VF Schottkey barrier diode D1 in electronic connection with the connector CON1 to provide reverse input voltage protection and to protect the solar panel from receiving power from the batteries of the unit at night or in other low-light conditions. To allow for easy selection of solar panels, this invention may be compatible with standard 12V solar panels, and can withstand the open circuit voltage supplied by 12V solar panels of 22V. However, it is to be understood that lower voltage solar panels can also be used. In addition, any DC power source having a voltage in the range of about 6V to about 22V (or any value therein) may be used to power the product.

Operation of the Exemplary Embodiment

Embodiments of the present invention may be operable to both identify and utilize batteries of different chemistries that are installed into the battery compartment of the system. In some embodiments, and without limitation, the battery compartment may be configured for a certain standard sized battery. However, in other embodiments, the battery compartment may be configured to receive batteries of multiple sizes or the system may include more than on battery compartment, each of which may accept batteries of a different size. The system may accept batteries of multiple different chemistries in the required size(s) to allow the user to utilize the types of batteries that are available to him (which may be limited in remote or underdeveloped areas). The present system may utilize primary batteries, such as zinc-carbon (dry cell), zinc-chloride, alkaline, or lithium chemistry; or a secondary batteries, such as $LiFePo_4$, NiCd, nickel-metal hydride (NiMH), NiZn, or lithium ion chemistry. Other embodiments may include other available battery types such as lead-acid, or yet to be developed chemistries.

Lithium iron phosphate ($LiFePo_4$, also known as LFP) batteries are commonly available in the 14500-package size (almost identical to AA) which has nominal voltage of 3.2V, or lithium-ion (Li-Ion) batteries, also in the 14500-package size which have a nominal voltage of 3.7V. LED lamps typically requires a minimum of 2.8V to achieve full luminosity of the LEDs. Either of these kinds of batteries will work well when in parallel configuration, providing the correct voltage to operate the LED lamp. Both battery types are rechargeable for thousands of cycles giving them substantial longevity. However, they are too expensive for some consumers.

Nickel Metal Hydride (NiMH) batteries are another type of secondary battery that may be used with the present system that is commonly available in AA battery size. This type of battery has a nominal voltage is 1.2V. In order to provide enough voltage to drive the LED lamp, three NiMH batteries may be configured in series (e.g., three NiMH batteries in series, four would exceed the maximum operable voltage of LEDs [4.6V]). NiMH batteries are well suited for powering LED lamps based on their voltage output, power stored as measured in mAHr, and relatively low price. The charge storage capacity (and thus charge cycle) is comparable to LFP and Li-Ion batteries. However, though they are more price accessible than the LFP or Li-Ion batteries, they can only take approximately 200 recharges before they lose the ability to hold a full charge and need to be replaced.

Figure 14:
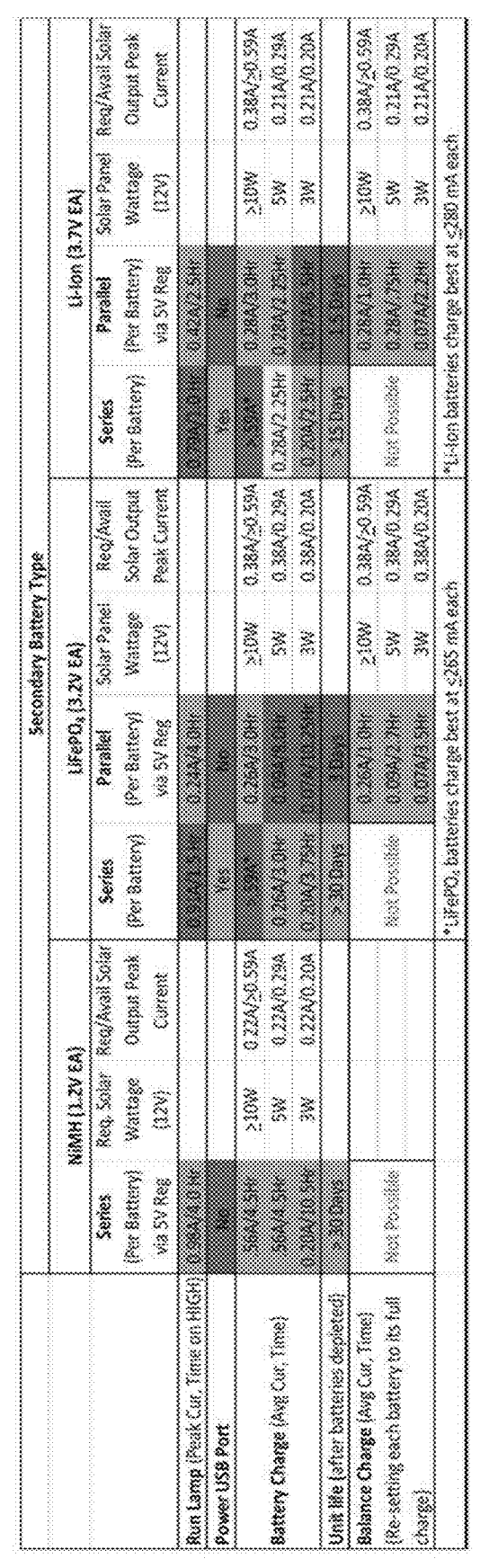

Conventional systems are unable to distinguish between batteries of different chemistries. Embodiments of the present invention are operable to switch between parallel and serial configurations based on the type of battery installed in the battery compartment. FIG. 14 is a table providing battery data (e.g., voltage output, charging characteristics, etc.) for a few different battery types when installed in the system (it should be noted that the system is not limited to the three battery types shown in FIG. 14, and that FIG. 14 provides only a sample of data that may utilized in programming the system of the present invention). The microcontroller IC1 may be programmed to alter the configuration of the batteries and the load of the system in order to maximize the useful power available from the batteries and maximize the life and charge cycle of the batteries based on such performance data for the batteries within the system as shown in FIG. 14. When a battery is installed, the controller is able to measure its voltage. If that voltage is then raised above a certain threshold (e.g., 1.1V), the microcontroller IC1 may then discern that a second battery has been installed. If that voltage is then raised again above a certain threshold then the microcontroller IC1 may discern that a third battery has been installed. Based on the counting of the amount of batteries and their total voltage (with the default configuration of the circuit in series), the unit may determine the type of battery based on the number of batteries and the total voltage provided. Because three LFP batteries at nominal voltage can be the same voltage as two fully charged Li-Ion batteries in combination with one fully charged NiMH battery, all in series, the system may be operable to take several additional measurements and performs several additional tests to more accurately determine the chemistry of the installed batteries.

The microprocessor IC1 may record the total voltage of the three batteries installed in the compartment while they are in the series configuration. If this voltage is higher than 4.29V, (the maximum limit for three fully charged NiMH batteries in series) then the unit turns on the first output RC4 from the microcontroller IC1 so that transistors Q14 and Q17 are in the open condition. The circuit is now in partial parallel configuration because transistors Q12, Q13, Q15, and Q16 are also in the open condition and the circuit is completed through the reverse body diodes of transistors Q12, Q13, Q15, and Q16, which typically cause a 0.5V drop in measured voltage of the batteries. The resulting voltage of the batteries in this configuration may be then recorded. Subsequently, the microprocessor IC1 may turn on the second output RC5 from the microcontroller IC1 so that transistors Q12, Q13, Q15, and Q16 are in the closed condition, causing the circuit to be in full parallel configuration and the resulting voltage of the batteries in this configuration may be recorded.

The microcontroller IC1 may then complete a first test by comparing the series voltage to the fully parallel voltage. If the voltage in series is 3 times larger (plus or minus a tolerance, such as +/−0.3V) than the measured voltage in full parallel configuration, then all three batteries are of the same type and they are recorded as lithium based. If the calculation is outside of the +/−0.3V tolerance then the batteries are classified as mixed chemistry. Because there are combinations of charged and depleted LFP and Li-Ion batteries that may pass the first test above, a second test may be performed. When taking the battery measurement in the partial parallel configuration, the voltage of the three batteries tend to equal one another, but because the measurement is through the reverse body diodes of transistors Q12, Q13, Q15 and Q16, the average voltage drop of 0.5V is much less when batteries of different individual voltages are installed. Thus, if the difference between the measured voltage of the batteries in the partial parallel configuration and in the fully parallel configuration is greater than or equal to about 0.4V, the batteries may be determined to be of the same type and classed as Li based. If the difference is less than about 0.4V, the batteries may be classified as mixed chemistry.

Figure 15:
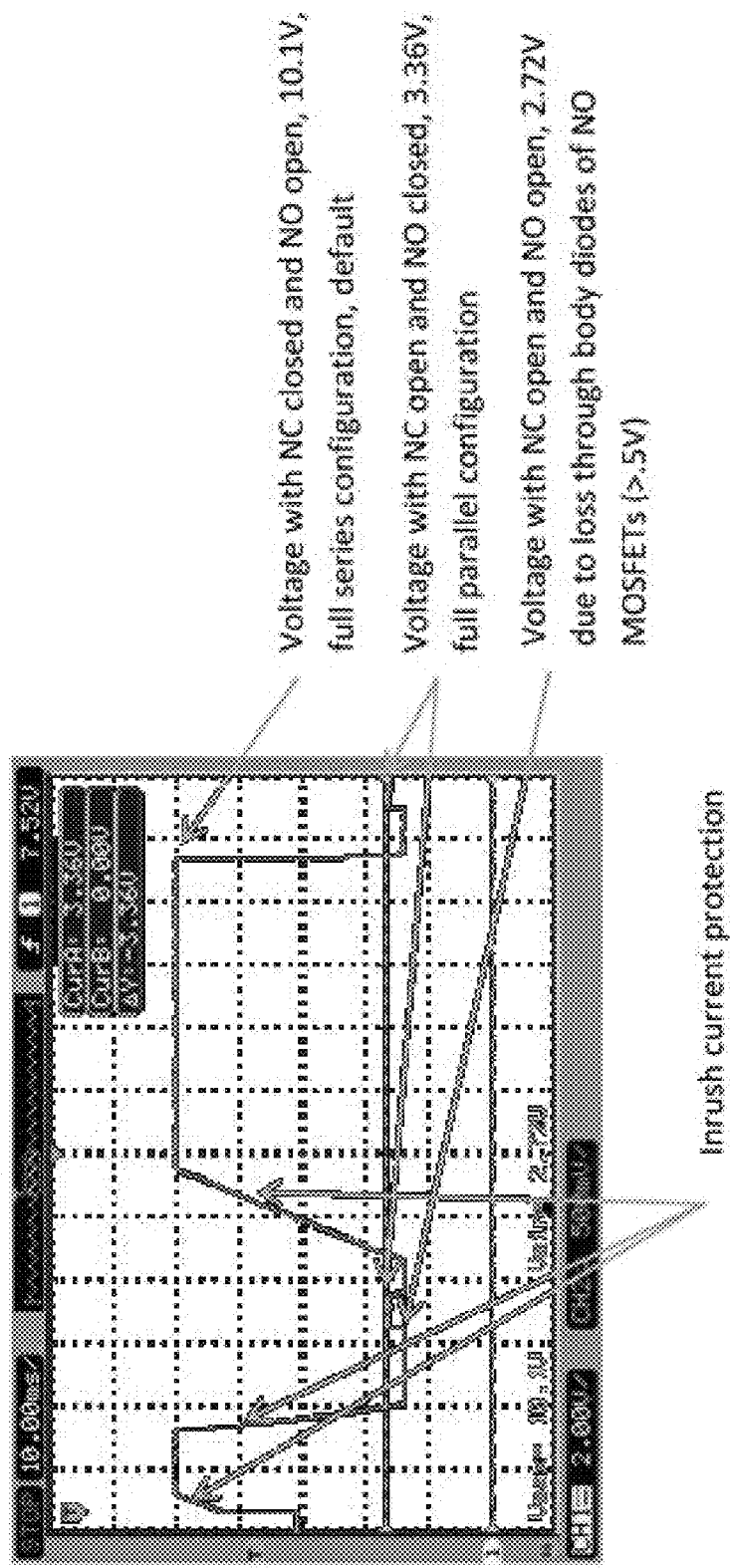
FIG. 15 is a graphical view of exemplary voltage measurements taken with various system configurations, which may be used to determine the type of batteries that are installed in an exemplary system of the present invention.

FIG. 15 provides an illustration of an exemplary set of voltage measurements taken from installed batteries by the microcontroller IC1. FIG. 15 also points out the points at which the inrush current protection provided by transistor Q1 is utilized.

When the batteries are classed as mixed chemistry, the battery configuration may then be placed in series, the step-down converter U1 may be turned on, and transistors Q4 and Q10 may be closed, and the unit will properly operate the LED lamp. However, transistors Q8 and Q3 may be open and no charging of the batteries will be allowed in order to prevent the damaging of the mixed chemistry batteries. In addition, transistor Q1 remains open such that if a solar panel is plugged in, the current will not immediately rush through the batteries. The system is operable to provide the voltage from the mixed chemistry batteries in series through the step-down converter U1 through the low VF Schottkey diode D5 to power the LED lamp without the risk of damaging the batteries or the system.

When lithium-based batteries are installed in the battery compartment, the type of lithium battery may be determined by measuring the voltage of the batteries. Initially, the IC1 may classify the batteries as LFP batteries based on the voltage measurements of the batteries in series, partial parallel, and parallel configurations. However, because depleted Li-Ion batteries can have the same voltage as charged LFP batteries, the microcontroller IC1 may conduct another test during charging of the batteries to differentiate the kind of Li-based batteries. Li-Ion batteries have a much faster rise in voltage in a given time (dV/dT) when the voltage of the batteries is about 3.5V, than do LFP batteries when their voltage is approximately 3.5V. Thus, if the batteries are initially classified as LFP, and during charging the dV/dT of the battery at 3.5V matches that of Li-Ion, then the microcontroller IC1 may automatically re-classify the installed batteries are as Li-Ion without damage to the batteries. The microcontroller IC1 may adjust the charging algorithm of the batteries to allow them to be fully charged.

In another example of a secondary test, if depleted non-rechargeable alkaline batteries are installed and are classified as NiMH, when charging begins, the batteries will immediately heat up, thus triggering the thermistor temperature sensors and the charging will be terminated.

The system of the present invention may also be operable to adjust a charging algorithm of the installed batteries to accommodate differences in charging rates of batteries of the same chemistry. Due to differing internal resistance in installed batteries of the same type (e.g., LFP batteries, Li-ion batteries, etc.), the installed batteries may take charge at different rates. Because secondary batteries can be recharged up to thousands of times, the difference in charge between batteries of the same kind may become significant after repeated recharging. Without any adjustment to the charging algorithm, one or more of the installed batteries may be left undercharged, thus limiting the collective charge life of the installed batteries and reducing the operation time of the lamp for a single recharge cycle.

To correct this issue, the system of the present invention may balance charge the installed batteries by charging one battery at a time. When one battery is installed its voltage is measured. Depending on the voltage of the battery, it could be classified as NiMH and the circuit will stay in the default series configuration. When external power is supplied, the unit will try to charge the battery. However, since the other two battery holders do not have batteries in them, and because of the direction of the reverse body diodes in transistors Q12, Q13, Q15, and Q16, no current will pass through the battery and therefore no current will flow through resistor R21. The microcontroller IC1 may then change the circuit configuration to full parallel and as current flows through resistor R21, the type of battery will be reclassified to the appropriate type (e.g., LFP or Li-Ion) based on the batteries voltage and the dV/dT measurements taken as described above.

Switching the batteries between series and parallel configurations yields many benefits that allow the product to be both user-friendly, and to operate in optimum ways under many external factors. The first is adaptability to various battery types and battery longevity when powering the LED lamp. For example, due to the different voltage characteristics of the various battery types available on the market, the system must be able to adapt the configuration of the batteries in order to maximize the length of the discharge period of the installed batteries. For example, since the system can operate with three AA NiMH batteries, each at 1.2V nominal voltage, the batteries should be in series to properly power to LED lamp. In this configuration, the lamp may run on high for at least 4 hours when the batteries are fully charged. However, if Li-Ion batteries are installed and remain in the series configuration, due to their high total voltage (11.1V nominal) the power may be passed through the step-down converter U1 to convert the voltage provided by the batteries to 5V. When the lamp LEDs are powered through the step-down converter U1, the peak current through the LEDs may be about 1.75 A. Thus, the current provided by the batteries to the step-down converter U1 may be about 790 mA (1.75 A*5V/11.1V). At this discharge rate, the Li-Ion batteries will only supply power to the LED lamp for about 1 hour. However, when the Li-Ion batteries are in the parallel configuration, not only is the input voltage to the lamp LED dropped from approximately 5V to approximately 3.7V (on average) but each of the three batteries supplies one-third of the total current and the current supplied by each battery may be reduced from about 790 mA to about 420 mA. The longevity of the batteries is highly dependent on it discharge rate, and a reduction in the discharge current to about 410 mA may extend the time the batteries are able to power the LED lamp to about 2.5 hours, increasing the charge cycle life of the batteries by a factor of about 2.5.

As a further example, if LFP batteries are installed and remain in the series configuration, due to their high total voltage (9.6V nominal) the power may pass through the step-down converter U1 to convert the power to 5V to power the LED lamp. When the lamp LEDs are powered with the step-down converter U1, the peak current through the LEDs may be about 1.75 A. Thus, the current provided by the batteries to the step-down converter U1 may be about 910 mA (1.75 A*5V/9.6V). At this discharge rate, the LFP batteries may only power the LED lamp for 1.5 hours. However, when the LFP batteries are in the parallel configuration, not only may the input voltage to the lamp LED dropped from approximately 5V to 3.2V (on average) but each of the three batteries supplies one-third of the total current and so the current supplied by each battery may be reduced from about 910 mA to about 240 mA. Due to the dependence of the longevity of the battery on the discharge rate, when the discharge current is reduced to about 240 mA, the batteries are able to power to LED lamp for 4.0 hours, increasing the charge cycle life of the batteries by a factor of about 2.7. This invention therefore provides measurable advantages to the consumer by allowing the consumer to utilize the batteries that are available to him and/or the batteries that best fits his needs, without having to endure short discharge period.

As noted above, when there is solar panel plugged into the unit of sufficient power, the step-down converter U1 will be turned on and will supply power to a USB dedicated charging port U3. Three lithium-based batteries, when configured in series, may supply enough voltage to power the step-down buck converter U1 and therefore the USB dedicated charging port U3. The system also allows an external electronic device to be charged through the charging port by the batteries alone. The microcontroller IC1 normally monitors the battery configuration and load on the circuit and does not allow an external electronic device to be charged when there is not sufficient power provided by the solar panels. However, the system includes a switching mechanism that allows the consumer to override the settings made by the microcontroller IC1 and configure lithium-based batteries into series. The consumer can switch the battery configuration to series by momentarily touching the off switch S1 and the low switch S2 simultaneously. When this is done the circuit will change to series configuration, with transistors Q1 and Q3 in the open condition, transistor Q8 in the closed condition, and step-down converter U1 turned on. To allow the simultaneous operation of the LED lamp (even though it will operate for a shortened duration as described above), transistors Q4 and Q10 may be in the closed condition. In this configuration, an external electronic device can be charged directly from the three lithium-based batteries when solar power is not available. When the USB charge port U3 is no longer charging, or when solar power is available, the microcontroller IC1 will stop the manually configured operation and again automatically control the circuit.

The present invention is also operable to balance the voltage and current applied to the batteries during charging from the solar panels when there is sufficient light for the solar panels to generate power based on the type of the installed batteries and the instantaneous power produced by the solar panels. As previously discussed, solar panels produce certain levels of current at certain voltages based on their size (measured in watts) and the amount of incident solar radiation that they receive. The relation between voltage and current are defined for each size of solar panel. At the MPP, solar panels produce a maximum amount of power (combination of voltage and current). The system optimizes the charging of batteries by automatically configuring the batteries in series or parallel and by automatically routing the power from the solar panel through the step-down converter U1 or by routing the power from the solar panel through Q1 to the batteries, depending on the particular chemistry of the installed batteries and the power available from the solar panel(s).

In one example, and without limitation, three NiMH batteries may be installed in the system, which need to be in series configuration in order to provide sufficient power to the LED lamp to a sufficient level. Series configuration is also ideal for NiMH battery charging. Thus, NiMH batteries may be maintained in series configuration whether they are being charged or they are powering the LED lamp or charging an external electronic device. If the three NiMH batteries were electrically connected to the solar panel, the solar panel output voltage may be equal to the battery voltage (under Kirchhoff's Voltage Law). For three NiMH batteries in series, the nominal voltage would be about 3.6V. However, 3.6V is substantially lower than the voltage of the MTV for standard 12V solar panels and at that voltage level, not all of the power that the solar panel can supply can be utilized by the system.

In order to avoid such inefficiencies, the microcontroller IC1 of the present system monitors the input voltage of the solar panel and the peak current and average current going through the batteries during charging. Under default conditions, the microcontroller IC1 will open transistor Q1, turn on step-down converter U1, close transistors Q4, Q10, and Q3, and will use transistor Q8 to provide pulse width modulation control of the current through the NiMH batteries. Based on the no-load voltage of the three batteries in series, the microcontroller IC1 will charge the batteries in the preferred method for NiMH batteries: e.g., a slow charge averaging about 300 mA for an initial period of about 15 min, then a fast charge with a peak current of about 750 mA and an average current of about 560 mA until a voltage of about 4.29V is reached indicating the batteries are fully charged, then perform a maintenance charge averaging about 200 mA for a period of about 45 minutes. Because this operation may be done through step-down converter U1, the current being supplied by the solar panel only needs to be about 220 mA (750 mA*5V/17V) and thus a 5 W or larger solar panel can be used to charge the batteries. The time required for this operation may be about 4.5 hours. During this operation, indicator light LED2 may be on (e.g., continuously) to indicate that there is ample solar power.

If the available light diminishes (e.g., a cloud moves over the solar panel), the power output will fall. Also, the consumer may not be able to afford a 5 W solar panel and may wish to purchase a smaller and therefore less expensive 3 W solar panel. Under such conditions, the circuit in its default configuration will not be able to charge the batteries because the output voltage of the solar panel will drop to near short-circuit conditions and therefore there will not supply enough voltage to turn on the step-down converter UL If the circuit was left in this configuration, no charging would occur and valuable energy from the sun would be wasted.

Embodiments of the present invention compensate for such conditions. The microcontroller IC1 monitors the current and voltage of different points in the circuit, and when it senses that there is a solar panel attached to the product, but that the solar panel cannot produce enough power to turn on step-down converter U1, the microcontroller IC1 will turn off the step-down converter U1, open transistors Q4, Q10, and Q3 and will close transistor Q1. Now the solar panel is feeding current directly to the batteries, at the battery voltage (as explained by Kirchhoff's Voltage Law) via pulse width modulation through transistor Q8. As a result, power can be drawn from underpowered or small solar panels to charge the installed batteries. The charge time will increase due to the lower current going through the batteries, but the circuit automatically adjusts for this by concurrently measuring the resulting voltage of the batteries. During these conditions an indicator light may indicate the particular charging mode. For example, and without limitation, LED2 may blink on and off to show that diminished power is available.

The microcontroller IC1 can also switch back to running the power provided by the solar panel through the step-down converter when conditions are appropriate. The microcontroller IC1 repeatedly measures the average and peak current, and if the 5 W or larger solar panel that was covered by clouds starts to produce sufficiently high levels of current because the cloud is no longer shading the solar panel, the microcontroller will automatically open transistor Q1, which will stop current from being drawn from the solar panel and its voltage will instantaneously recover to open circuit voltage of approximately 22V. The microcontroller IC1 will then sense ample voltage and may turn on step-down converter U1, close transistors Q4, Q10, and Q3, and operation of the solar panel at the MTV may be restored. To prevent hysteresis, this operation may be cycled no more than once during a designated time period (e.g., a time frame in a range of about 10 to about 100 seconds, such as every 12 seconds or any value or range of values in that range).

When LFP batteries are installed, by default the batteries are configured in parallel because it is the optimum configuration for operating the LED lamp. Like NiMH batteries, the default condition for charging LFP batteries may be through the step-down converter U1. The microcontroller IC1 may classify the batteries as LFP, and it may charge the batteries in a constant current manner until the no-load voltage of the batteries reaches about 3.6V, and it may then charge the LFP batteries under constant voltage of about 3.6V for a period of about 45 min. In a constant current mode, the ideal average current for LFP batteries is about 265 mA per battery, with a peak current of about 380 mA in a pulse width modulation process. Since the batteries are in parallel, the total current going through the batteries is at an average of about 795 mA and at a peak of about 1140 mA. With these currents, three LFP batteries may be fully charged within about 3 hours. To provide this much current while the solar panel is operating at its MPP, the solar panel needs to be of the 10 W size or larger. If the solar panel is not this large, or if it becomes covered by clouds, the microcontroller IC1 will automatically recognize the drop deficiency in power and reconfigure the circuit to compensate for the deficiency.

As the microcontroller IC1 monitors the current and voltage of different points in the circuit, and it senses that there is a solar panel attached to the product, but that the solar panel cannot produce enough power to turn on the step-down converter U1, the microcontroller IC1 will turn off the step-down converter U1, open transistors Q4, Q10, and Q3, will reconfigure the three LFP batteries into series configuration, and will close transistor Q1. Under these conditions, instead of the current being divided into 3 parts to charge LFP three batteries, all of the current will go through the batteries in series, and the batteries may be charged in about 3 hours with a 5 W solar panel and in about 3.8 hours with a 3 W solar panel. According to Kirchhoff's Voltage Law, the solar panel when applying current directly through the batteries in series will be operating at the voltage of the three batteries in series and by pulse width modulation through transistor Q8, the batteries will be properly charged.

During this mode of operation, an indicator light or other indicator device may provide an indicator to notify the user of the current functional mode. For example, LED 2 may blink on and off to show that diminished power is available. Under the above conditions, if the batteries had been left in the parallel configuration it may have taken about 8 hours to fully charge three LFP batteries with a 5 W solar panel (due the current being divided by the three batteries). Similarly, it would have taken 10 or more hours to fully charge three LFP batteries with a 3 W solar panel. However, the system of the present invention may be able to switch the battery configuration between parallel and series in order to reduce the charge time for LFP batteries. In order to protect the LED lamp from overvoltage (due the solar panel operating at near 10 volts), the operation of the lamp may not be allowed in this configuration.

As the LFP batteries are being charged in the series configuration, when the microcontroller IC1 senses that there is sufficient voltage and current, the microcontroller IC1 may automatically open transistor Q1 which will stop current from being drawn from the solar panel to reset and its voltage will instantaneously recover to open circuit voltage of approximately 22V. The microcontroller IC1 may then sense ample voltage provided by the solar panel and will turn on step-down converter U1, close transistors Q4, Q10, and Q3, change the battery configuration to parallel, and restore the solar panel to MPP operation. When the circuit is restored to this configuration, the operation of the lamp may be allowed. To prevent hysteresis, this operation may be cycled no more than once during a designated time period (e.g., a time frame in a range of about 10 to about 100 seconds, such as every 12 seconds or any value or range of values in that range).

In another example in which Li-Ion batteries are installed, by system default the batteries are configured in parallel as this configuration may be optimal for operating the LED lamp. Like LFP batteries, the system default configuration for charging Li-Ion batteries is through the step-down converter U1. Since the microcontroller IC1 may identify and classify the batteries as Li-Ion, it will charge the batteries in their preferred method of constant current until the no-load voltage of the batteries reaches about 4.2V, and then under constant voltage of about 4.2V for about 45 min. In the constant current mode, the ideal average current for Li-Ion batteries is about 230 mA per battery, with a peak current of about 256 mA in a pulse width modulation process. Since the batteries are in parallel, the total current going through the batteries is an average of about 690 mA and a peak of about 770 mA. Applying the above charging protocol, the system will fully charge three Li-Ion batteries within about 2.25 hours. In order to provide this much current while the solar panel is operating at its MPP, the solar panel should be a 5 W panel or larger. If the solar panel is not sufficiently large, or if it covered by clouds, the system will automatically compensate for the shortfall.

The microcontroller IC1 monitors the current and voltage of different points in the circuit, and when it senses that there is a solar panel attached to the product, but that the solar panel cannot produce enough power to turn on step-down converter U1, the microcontroller will turn off U1, open transistors Q4, Q10, and Q3, will reconfigure the three Li-Ion batteries into series configuration, and will close transistor Q1. Under these conditions, instead of the current being divided into 3 parts to charge three batteries, all of the current will go through the batteries in series. According to Kirchhoff's Voltage Law, the solar panel will be operating at the voltage of the three batteries in series and by pulse width modulation through transistor Q8, and the batteries may be fully charged. If the batteries were left in the parallel configuration under the above conditions, it would take around 6.5 hours to fully charge three LFP batteries with a 3 W solar panel (due the current being divided by the three batteries). But because the system is able to change the battery configuration between parallel and series, the three LFP batteries will charge in about 2.5 hours with a 3 W solar panel. In order to protect the LED lamp from overvoltage (due the solar panel operating at near 10 volts), the operation of the lamp may not be allowed in this configuration. Also, during these conditions an indicator light may indicate the particular charging mode. For example, and without limitation, LED2 may blink on and off to show that diminished power is available.

As the Li-Ion batteries are being charged in the series configuration, the microcontroller IC1 continues to monitor the voltage and current at various points in the system circuitry. If the microcontroller IC1 senses that the solar panel is providing sufficient power to charge the batteries in parallel, it will automatically open transistor Q1, which will stop current from being drawn from the solar panel to reset the solar panel, and its voltage will instantaneously recover to an open circuit voltage of approximately 22V. The microcontroller IC1 will then sense ample voltage and will turn on step-down converter U1, close transistors Q4, Q10, and Q3, change the battery configuration to parallel, and the solar panel may be restored MPP operation. To prevent hysteresis, this operation may be cycled no more than once during a designated time period (e.g., a time frame in a range of about 10 to about 100 seconds, such as every 12 seconds or any value or range of values in that range). When the circuit is restored to the parallel configuration, operation of the lamp may once again be allowed.

It should be noted that if the three LFP or Li-Ion batteries were in a series configuration and a 10 W or larger solar panel was installed, and transistor Q1 is closed, the peak current through the batteries would be too high and would damage the batteries. Also, when balance charging LFP and Li-Ion batteries, the battery configuration is always in parallel configuration as noted above.

Of special note, when the less popular NiCad secondary batteries are installed, because of their similarity to NiMH batteries in their voltage and preferred charge methods, they are treated identical to NiMH batteries.

The present invention concerns self-contained, rechargeable power systems for areas having unreliable electric power grid systems or no electric power grid system at all, and methods related thereto. The power systems may include one or more solar panels of various sizes to provide an off-grid power generation source, a compartment for receiving batteries of various chemistries, a load, and a control circuitry that is operable to detect the voltage output of the batteries that are installed in the system to determine their specific battery chemistry and then adjust the charge algorithm of the batteries to optimize both the charge capacity and the cycle life of the batteries. The load may be one or more light emitters and/or one or more external electronic devices connected through the system by a charge port. Unlike in conventional portable or solar power charging and lighting technologies, the control circuitry in the systems of the present invention may monitors the power provided by the power generation source, the charge of the batteries, and the required current for running the load, and based on the various data, the control circuitry may adjust the current and voltage individually applied to the load and the batteries and adjust the amount of current drawn from the power generation source.

The systems of the present invention may also be highly customizable. As the consumer wishes to perform several functions at the same time, such as charge batteries and charge USB compatible devices and operate the lamp at the simultaneously, this invention allows the consumer to upgrade their solar panel to larger sizes or adding additional solar panels of the same size to facilitate multiple and various levels of operation. In all cases, the invention monitors the available power and optimizes the performance as described above, prioritizing first with battery charging, then the addition of external device charging, then the addition of lamp operation. Thus, this invention provides optimum performance for the consumer while allowing the consumer to choose a smaller and therefore lower cost solar panel, or larger and therefore more powerful solar panels to handle more operations.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

It is to be understood that variations and modifications of the present invention may be made without departing from the scope thereof. It is to be appreciated that the features disclosed herein may be used different combinations and permutations with each other, all falling within the scope of the present invention.

What is claimed is:

1. A rechargeable, self-contained power system, comprising:
   a. a power source controller circuitry operable to receive power from a plurality of power sources;
   b. a battery receiver operable to receive a plurality of secondary batteries, wherein said plurality of power sources is operable to provide electrical power to charge said plurality of secondary batteries, wherein said battery receiver includes battery connection circuitry that electrically connects said secondary batteries;
   c. a processor operable to measure an electrical characteristic of said plurality of power sources and direct said power source controller circuitry to switch between parallel and series connections between said plurality of power sources during a charging process of said plurality of secondary batteries based upon at least one of said electrical characteristic of said plurality of power sources, a variable voltage level required for charging said plurality of secondary batteries, and variable load voltage resulting from the connection of one or more external devices to said power system
   wherein said processor is operable to measure at least one electrical characteristic of said plurality of secondary batteries received from said battery connection circuitry and analyze said at least one electrical characteristic of said secondary batteries to determine said voltage level required for charging said plurality of secondary batteries.

2. The system of claim 1, wherein a battery control circuitry is operable to configure the connections of said plurality of batteries between parallel and series connections.

3. The system of claim 1, wherein said plurality of power sources comprises a plurality of power sources that each produce a variable amount of power.

4. The system of claim 3, wherein said plurality of power sources comprises a plurality of solar panels and said system is operable to accept solar panels of different sizes and wattages without damage to said system.

5. The system of claim 3, wherein said processor monitors electrical characteristics at a plurality of points in the power source controller circuitry, including said voltages produced by said plurality of power sources.

6. The system of claim 5, wherein said processor monitors said electrical characteristics at said plurality of points in the power source control circuitry continuously.

7. The system of claim 1, wherein said battery receiver is operable to accept one or more primary or secondary batteries.

8. The system of claim 1, wherein said system is operable to simultaneously accept batteries of different chemistries in said battery receiver and draw current from said batteries without damage to said system.

9. The system of claim 1, wherein said processor is operable to direct said power source controller circuitry to draw power from said plurality of power sources at a maximum power point.

10. The system of claim 1, wherein said battery receiver includes battery connection circuitry that electrically connects said batteries and is operable to configure the connections of said plurality of batteries between parallel and series connections, and said processor is in electronic connection with a plurality of points in said battery control circuit and is operable to monitor electrical properties of said plurality of batteries.

* * * * *